(12) United States Patent
Satoh

(10) Patent No.: US 7,216,992 B2
(45) Date of Patent: May 15, 2007

(54) REFLECTIVE DISPLAY DEVICE

(75) Inventor: Eiji Satoh, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/340,619

(22) Filed: Jan. 27, 2006

(65) Prior Publication Data

US 2006/0170633 A1    Aug. 3, 2006

(30) Foreign Application Priority Data

Feb. 1, 2005    (JP)    ............... 2005-025453

(51) Int. Cl.
  *G02B 5/124*    (2006.01)
  *G02F 1/1335*    (2006.01)
(52) U.S. Cl. ..................... 359/530; 349/113
(58) Field of Classification Search ............. None
  See application file for complete search history.

(56) References Cited

U.S. PATENT DOCUMENTS

| | | | |
|---|---|---|---|
| 5,132,823 A * | 7/1992 | Kamath et al. ............ | 349/113 |
| 6,166,856 A | 12/2000 | Araki et al. | |
| 6,657,766 B2 | 12/2003 | Minoura et al. | |
| 6,788,366 B2 | 9/2004 | Sawayama et al. | |
| 2005/0088743 A1 * | 4/2005 | Sawayama et al. ......... | 359/530 |

FOREIGN PATENT DOCUMENTS

| | | |
|---|---|---|
| JP | 05-107538 | 4/1993 |
| JP | 2000-019490 | 1/2000 |

OTHER PUBLICATIONS

U.S. Appl. No. 11/340,544, filed Jan. 27, 2006, entitled "Reflective Display Device".

\* cited by examiner

*Primary Examiner*—James Phan
(74) *Attorney, Agent, or Firm*—Nixon & Vanderhye, P.C.

(57) ABSTRACT

A reflective display device includes a retroreflective layer including a plurality of unit structures that are arranged two-dimensionally on a virtual plane and a modulating layer, which is arranged closer to a viewer than the retroreflective layer is and which is switchable between a first state and a second state that have mutually different optical properties. The reflective display device conducts a display operation by using light that has been reflected back from the retroreflective layer. Each unit structure of the retroreflective layer has a recess defined by three planes that are opposed substantially perpendicularly to each other. An azimuthal direction, which is defined by projecting a normal to one of the three planes onto the virtual plane, and another azimuthal direction, which is defined by projecting an on-screen upward direction onto the virtual plane, form an angle of at most 30 degrees.

16 Claims, 12 Drawing Sheets

BLACK

LC IN TRANSMITTING STATE

WHITE

LC IN SCATTERING STATE

○ PEAK POINT
● BOTTOM POINT
△ SADDLE POINT

● :BOTTOM POINT

● :BOTTOM POINT

● :BOTTOM POINT

○ PEAK POINT
● BOTTOM POINT
△ SADDLE POINT

⊗ : INCOMING LIGHT
⊙ : RETROREFLECTED LIGHT

○ : PEAK POINT
● : BOTTOM POINT

- ○ : PEAK POINT
- ● : BOTTOM POINT

FIG.10A

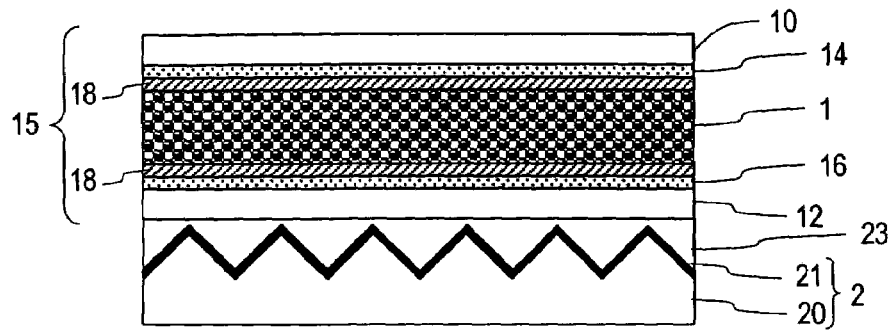

FIG.10B

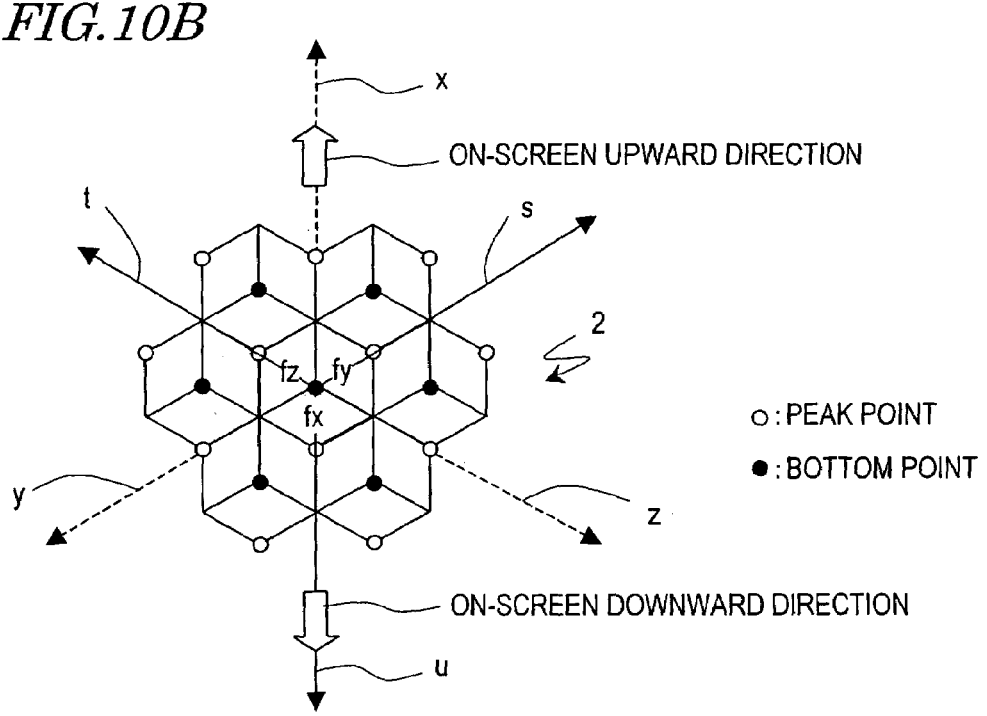

○ : PEAK POINT
● : BOTTOM POINT s,t,u:Azimuthal Directions Defined by Projecting Twice Reflected Directions onto Virtual Plane
x:Azimuthal Direction Defined by Projecting Normal to fx Plane onto the Virtual Plane
y:Azimuthal Direction Defined by Projecting Normal to fy Plane onto the Virtual Plane
z:Azimuthal Direction Defined by Projecting Normal to fz Plane onto the Virtual Plane

UP

DOWN

○ : PEAK POINT
● : BOTTOM POINT

DOWN

69

REFLECTIVE DISPLAY DEVICE

BACKGROUND OF THE INVENTION

1. Field of the Invention

The present invention relates to a reflective display device including a retroreflective layer.

2. Description of the Related Art

A reflective liquid crystal display device for conducting a display operation by utilizing surrounding light as its light source has been known in the art. Unlike a transmissive liquid crystal display device, the reflective liquid crystal display device needs no backlight, thus saving the power for light source and allowing the user to carry a smaller battery. Also, the space to be left for the backlight in a transmissive device or the weight of the device itself can be saved. For these reasons, the reflective liquid crystal display device is effectively applicable to various types of electronic devices that should be as lightweight and as thin as possible.

A technique of combining a scattering type liquid crystal display mode and a retroreflector is one of known measures to improve the display quality of a reflective liquid crystal display device. Such a technique is disclosed in Japanese Patent Applications Laid-Open Publications Nos. 5-107538, 2000-19490, 2002-107519 and 11-15415, for example.

Hereinafter, the operation principle of a display device that adopts such a technique will be described with reference to FIGS. 1A and 1B, which schematically illustrate the black and white display modes of the display device.

As shown in FIG. 1A, if a liquid crystal layer 1 is controlled to exhibit a transmitting state, an incoming light ray 3, which has been emitted from a light source 5 outside of the display device, is transmitted through the liquid crystal layer 1 and then reflected back by a retroreflector 2 toward its light source 5 as pointed by the arrow 4b. Thus, the light ray 3 that has been emitted from the light source 5 does not reach the eyes of a viewer 6. In such a state, the image reaching the eyes of the viewer 6 from this display device is the image of his or her own eyes. In this manner, the "black" display mode is realized.

On the other hand, if the liquid crystal layer 1 is controlled to exhibit a scattering state, the incoming light ray 3 that has been emitted from the light source 5 is scattered by the liquid crystal layer 1 as shown in FIG. 1B. Specifically, if the liquid crystal layer 1 is a forward scattering liquid crystal layer, most of the incoming light ray 3 is scattered forward by the liquid crystal layer 1 and then reflected back by the retroreflector 2 toward the viewer 6 through the liquid crystal layer 1 in the scattering state (as pointed by the arrows 4w). In this case, since the retroreflectivity of the retroreflector 2 is disturbed by the scattering caused by the liquid crystal layer 1, the incoming light ray 3 does not return to its light source. In the meantime, another portion of the incoming light ray 3 is scattered backward by the liquid crystal layer 1 and directed toward the viewer 6 (not shown). In this case, that portion of the light directed toward the viewer 6 reaches his or her eyes, thus realizing a "white" display mode. According to this operation principle, not just the backscattering but also forward scattering of the liquid crystal layer 1 can be used effectively. As a result, a brighter "white" display is achieved.

By conducting a display operation based on this operation principle, a monochrome display is realized without using any polarizer. Consequently, a high-brightness reflective liquid crystal display device, of which the optical efficiency is not decreased by the use of polarizers, is realized.

As the retroreflector 2 shown in FIGS. 1A and 1B, a two-dimensional array of unit structures, such as a microsphere array, a microlens array or a corner cube array, may be used. Among these various types of arrays, the "corner cube array" is a two-dimensional arrangement of corner cubes, each defined by three planes that are opposed substantially perpendicularly to each other, on a certain "virtual plane". The "virtual plane" is typically a plane that is defined parallel to the surface of the display panel of a display device. A light ray that has entered a corner cube is ideally reflected back toward its source by the three planes that form the corner cube. FIGS. 2A and 2B are respectively a plan view and a perspective view illustrating the configuration of a corner cube array. The corner cube array shown in FIGS. 2A and 2B is a cubic corner cube array in which a number of corner cubes, each being defined by three square planes that are opposed perpendicularly to each other, are arranged two-dimensionally.

A corner cube array may have a high retroreflectivity. That is why by using a corner cube array, the contrast ratio can be increased on the display screen of a reflective display device. To further increase the contrast ratio on the screen of a reflective display device that uses a corner cube array, Japanese Patent Application Laid-Open Publication No. 2002-107519 suggests that a corner cube array consisting of corner cubes of a reduced size be used as a retroreflector. A corner cube array consisting of corner cubes of such a reduced size (e.g., with an arrangement pitch of 5 mm or less) will be referred to herein as a "micro corner cube array (MCCA)". Also, the arrangement pitch of corner cubes in an MCCA is identified herein by Pcc (i.e., the shortest distance between two adjacent vertices) as shown in FIG. 2A.

Next, a specific configuration for a reflective display device that uses an MCCA as a retroreflector will be described.

A reflective display device with an MCCA may be formed by arranging the MCCA outside of a display panel such that the MCCA is located on the opposite side (i.e., the non-viewer side) of the display panel. Such an arrangement in which an MCCA is attached to the non-viewer side of a display panel (which will be referred to herein as an "MCCA attached structure") is disclosed in Japanese Patent Application Laid-Open Publication No. 11-15415, for example. As used herein, the "display panel" refers to a panel in which a modulating layer such as a liquid crystal layer and a voltage application means for applying a voltage to the modulating layer are sandwiched between two opposed substrates. Of these two opposed substrates, the one substrate to face the viewer will be referred to, herein as a "front substrate" and the other substrate not to face the viewer a "rear substrate". In the MCCA attached structure, the MCCA is arranged behind the rear substrate.

Meanwhile, a reflective display device with a structure in which an MCCA is arranged between the two substrates of a display panel (which will be referred to herein as an "MCCA embedded structure") was also proposed. For example, Japanese Patent Application Laid-Open Publication No. 2002-107519 mentioned above discloses a structure in which a retroreflector is arranged between the modulating layer and the rear substrate of a display panel.

In a reflective display device that uses an MCCA, the black display may sometimes have a slightly decreased contrast ratio due to the leakage of light and turn slightly lightened black (which is called a "dark-state leakage") or white and black may sometimes be inverted in a grayscale tone display mode (which is called a "grayscale inversion") due to the shape and plane accuracy of the MCCA or according to the direction in which light has entered the MCCA. The present inventors analyzed these problems extensively. And the results of our analysis will be described with reference to the accompanying drawings.

In the following example, MCCA Nos. 1, 2 and 3 with mutually different shapes will be described. FIGS. 3A, 3B and 3C are top views illustrating the unit structures (i.e., corner cubes) of MCCA Nos. 1, 2 and 3, respectively.

FIG. 3A shows one of the corner cubes that form MCCA No. 1. This corner cube has three rectangular isosceles triangular planes that are opposed substantially perpendicularly to each other, and is illustrated as an equilateral triangle 7 consisting of three isosceles triangles on this top view. In MCCA No. 1, a lot of corner cubes like this are arranged on a virtual plane. FIG. 3B shows seven of a huge number of corner cubes that form MCCA No. 2. Each of the corner cubes forming MCCA No. 2 is illustrated as a regular hexagon 8, of which the center is defined by a bottom point, on this top view. FIG. 3C shows six of a huge number of corner cubes that form MCCA No. 3. Each of the corner cubes forming MCCA No. 3 is illustrated as a rectangle 9, of which the center is defined by a bottom point, on this top view.

First, a situation where the corner cubes that form an MCCA are not represented by a point symmetric pattern, of which the center of symmetry is defined by a bottom point, on a top view will be described. For example, the corner cube shown in FIG. 3A is represented by the equilateral triangle 7 on its top view but the equilateral triangle 7 is not point symmetric. Thus, in an MCCA consisting of such corner cubes, even a light ray that has been incident perpendicularly to the MCCA may not be reflected by all three planes that form a corner cube depending on its point of incidence on the corner cube. It should be noted that the MCCA has corner cubes that are arranged two-dimensionally on a virtual plane as described above. Thus, the phrase "perpendicularly to an MCCA (or a corner cube array)" means herein "perpendicularly to the virtual plane of the MCCA. Generally speaking, if something enters perpendicularly to an MCCA, it will impinge perpendicularly onto the surface of the display screen of a display device including the MCCA.

As shown in FIG. 3A, a light ray that has been incident perpendicularly onto an MCCA 1 at a point a is reflected from the points a, b and c in this order. That is to say, the light ray is sequentially reflected by the three planes of a single corner cube back toward its source. However, another light ray that has been incident perpendicularly onto the MCCA 1 at another point d is reflected from the points d and e in this order and then leaves this corner cube. In other words, the light ray that has been incident on the point d is reflected by only two of the three planes of the corner cube and therefore, is not retroreflected but goes in a different direction. Stated otherwise, a light ray that has been incident from that different direction onto the point e will be reflected from the point d and then leave the corner cube perpendicularly to the MCCA 1.

As described above, when a light ray is incident perpendicularly onto an MCCA, the light ray will be retroreflected just as intended if the light ray enters predetermined areas of the three planes of a single corner cube. In the corner cube shown in FIG. 3A, the predetermined areas are represented by a regular hexagon 7', of which the center is defined by the bottom point on its top view. Meanwhile, a light ray that has been incident onto other areas of the three planes of the corner cube will be reflected in a different direction, not the direction the light ray has come from. This means that if a light ray has entered a corner cube from the former direction, then the light ray will be reflected away perpendicularly to the MCCA. That is why in a reflective display device using such an MCCA, even if the viewer faces its screen squarely, part of the external light to be used for display purposes in a black display mode will enter his or her eyes, thus causing the dark-state leakage or grayscale inversion mentioned above.

Next, a situation where the corner cubes that form an MCCA are represented by a point symmetric pattern, of which the center of symmetry is defined by the bottom point, on its top view will be described. For example, each of the corner cubes shown in FIGS. 3B and 3C is represented by a point symmetric pattern, of which the center of symmetry is defined by the bottom point, on its top view (i.e., a regular hexagon 8 or a rectangle 9). Likewise, in the cubic corner cube array that has already been described with reference to FIGS. 2A and 2B, each corner cube is represented by a regular hexagon, of which the center of symmetry is also defined by the bottom point, on its top view.

Any light ray that has been incident perpendicularly onto an MCCA consisting of such corner cubes will always be reflected back toward its source by the three planes of one of its corner cubes, including the point of incidence, no matter at which area of the corner cube the point of incidence is located. Consequently, if the viewer squarely faces the screen of a display device including such an MCCA, no dark-state leakage or grayscale inversion should occur as a matter of principle. However, even in a reflective display device including such an MCCA, if a light ray is incident non-perpendicularly onto the MCCA, part of the light ray will not be reflected back toward its source as will be described in detail later. That is why the dark-state leakage or grayscale inversion may still happen depending on the direction in which the viewer is watching the screen of that display device.

Furthermore, no matter what planar pattern each of the corner cubes of an MCCA has, it is extremely difficult to define the corner cubes with high plane accuracy, particularly when the corner cubes are arranged at a very small pitch in the MCCA. Thus, each corner cube will actually have some errors in its "normal angle" or its degree of planarity. As used herein, the "normal angle" refers to the angle formed between a normal to some plane of a corner cube and a virtual plane. Therefore, if the normal angle has some error, then the angle defined by a normal to one plane of a corner cube with respect to the virtual plane is not an ideal one, and the angle formed by the three planes of the corner cube is not equal to 90 degrees, either. On the other hand, the error of the planarity refers to partial or entire warp of some plane of a corner cube and to rounding of the peak or bottom point of a corner cube. Due to those errors, the retroreflectivity of the MCCA decreases. As a result, even if the viewer is facing the screen squarely, dark-state leakage or grayscale inversion may still happen.

Consequently, it is difficult to eliminate such dark-state leakage or grayscale inversion and get excellent display quality realized by using a conventional reflective display device with an MCCA.

SUMMARY OF THE INVENTION

In order to overcome the problems described above, an object of the present invention is to eliminate such dark-state leakage or grayscale inversion and get the display quality improved by using a reflective display device including a retroreflective layer with an MCCA shape.

A reflective display device according to a preferred embodiment of the present invention includes a retroreflective layer including a plurality of unit structures that are arranged two-dimensionally on a virtual plane and a modulating layer, which is arranged closer to a viewer than the retroreflective layer is and which is switchable between a first state and a second state that have mutually different optical properties. The reflective display device conducts a display operation by using light that has been reflected back from the retroreflective layer. Each unit structure of the retroreflective layer has a recess defined by three planes that are opposed substantially perpendicularly to each other. An azimuthal direction, which is defined by projecting a normal to one of the three planes onto the virtual plane, and another azimuthal direction, which is defined by projecting an on-screen upward direction onto the virtual plane, form an angle of at most 30 degrees.

In one preferred embodiment of the present invention, the angle is preferably 12 degrees or less.

A reflective display device according to another preferred embodiment of the present invention includes a retroreflective layer including a plurality of unit structures that are arranged two-dimensionally on a virtual plane and a modulating layer, which is arranged closer to a viewer than the retroreflective layer is and which is switchable between a first state and a second state that have mutually different optical properties. The reflective display device conducts a display operation by using light that has been reflected back from the retroreflective layer. Each unit structure of the retroreflective layer has a recess defined by three planes that are opposed substantially perpendicularly to each other. A light ray, which has been incident substantially perpendicularly to the virtual plane and then reflected by only two of the three planes of any of the unit structure, goes back in multiple particular directions that are defined by the shape of the unit structure. An azimuthal direction, which is defined by projecting any of those particular directions onto the virtual plane, and another azimuthal direction, which is defined by projecting an on-screen downward direction onto the virtual plane, form an angle of at most 30 degrees.

In one preferred embodiment of the present invention, the angle is preferably 12 degrees or less.

In another preferred embodiment, the unit structures of the retroreflective layer are preferably arranged so as to face substantially the same direction.

In this particular preferred embodiment, the three planes of each said unit structure, which are opposed substantially perpendicularly to each other, are all square.

In yet another preferred embodiment, the reflective display device may further include: a front substrate, which is arranged closer to the viewer than the modulating layer is; a rear substrate, which is arranged behind the modulating layer and which faces the front substrate; and means for applying a voltage to the modulating layer. The means is arranged between the front and rear substrates. The retroreflective layer may be arranged between the modulating layer and the rear substrate.

In an alternative preferred embodiment, the reflective display device may further include: a front substrate, which is arranged closer to the viewer than the modulating layer is; a rear substrate, which is arranged behind the modulating layer and which faces the front substrate; and means for applying a voltage to the modulating layer. The means is arranged between the front and rear substrates. The retroreflective layer may be arranged behind the rear substrate.

In yet another preferred embodiment, the reflective display device may further include a high refractive index layer with a refractive index of 1.06 to 2.7 between the retroreflective layer and the rear substrate, and the respective surfaces of the unit structures of the retroreflective layer may be in contact with the high refractive index layer.

Alternatively, the reflective display device may further include a low refractive index layer with a refractive index of 1.0 to less than 1.06 between the retroreflective layer and the rear substrate, and the respective surfaces of the unit structures of the retroreflective layer may be in contact with the low refractive index layer.

According to various preferred embodiments of the present invention described above, the dark-state leakage phenomenon can be reduced significantly in a reflective display device including a retroreflective layer and the display contrast ratio thereof can be increased. In addition, the grayscale inversion can also be reduced and excellent display quality, including good visibility, is realized. Furthermore, the dark-state leakage and grayscale inversion can be minimized no matter from which direction the viewer is watching the screen of the display device.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 10A is a schematic cross-sectional view illustrating a configuration for a reflective display device according to a first preferred embodiment of the present invention.

FIG. 10B is a plan view showing the arrangement of a retroreflective layer in the reflective display device.

DETAILED DESCRIPTION OF PREFERRED EMBODIMENTS

The present inventors carried out various measurements to look into those problems of a conventional reflective display device including a retroreflective layer. The results will be described before specific preferred embodiments of the present invention are set forth. In the following example, a reflective display device, having an MCCA attached structure, will be described as a sample.

Figure 4:
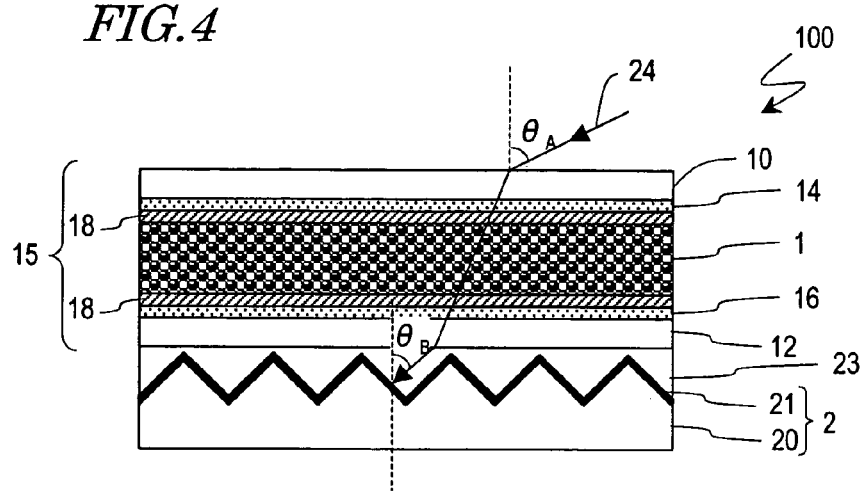
FIG. 4 is a schematic cross-sectional view illustrating a conventional configuration for a display device including a retroreflector behind its display panel.

FIG. 4 is a schematic cross-sectional view illustrating a conventional configuration for a reflective display device having an MCCA attached structure. The display device 100 includes a display panel 15 and a retroreflective layer 2, which is arranged behind the display panel 15.

The display panel 15 includes a front substrate 10 with color filters (not shown), a transparent conductive film 14 and an alignment film 18 and a rear substrate 12, which is arranged so as to face the front substrate 10. A scattering liquid crystal layer 1, which can assume either a scattering state or a transmitting state, is interposed between these two substrates 10 and 12. On the surface of the rear substrate 12, thin-film transistors (TFTs, not shown) functioning as switching elements, pixel electrodes 16 and another alignment film 18 are arranged so as to face the liquid crystal layer 1. Major components of the display panel 15 generally have substantially equal refractive indices (of about 1.5, for example).

The retroreflective layer 2 is arranged behind the rear substrate 12 and includes a resin layer 20 that defines an MCCA shape and a metal layer 21 that has been deposited on the resin layer 20. The gap between the retroreflective layer 2 and the rear substrate 12 may be filled with a gas 23 (e.g., the air with a refractive index of 1.00).

By controlling the voltage applied to the liquid crystal layer 1 by using the TFTs and pixel electrodes 16, the display device 100 can switch the liquid crystal layer 1 between the scattering and transmitting states.

If the liquid crystal layer 1 is controlled so as to transmit an incoming light ray, the light ray 24 that has entered the front substrate 10 of the display device 100 transmits through the display panel 15 and reaches the metal layer 21 of the retroreflective layer 2. Then, the light ray 24 is refracted in the interface between the display panel (with a refractive index of about 1.5) and the air (with a refractive index of about 1.00) as shown in FIG. 4. And the angle $\theta_A$ of incidence of the light ray 24 that has traveled through the external air and then entered the front substrate 10 becomes substantially equal to the angle $\theta_B$ of incidence of the light ray 24 that has entered the metal layer 21 through the air 23. It should be noted that the angles $\theta_A$ and $\theta_B$ of incidence refer to a polar angle defined between the direction perpendicular to the surface of the display panel 15 and the direction the light ray 24 has come from and a polar angle defined between the direction perpendicular to the virtual plane of the MCCA and the direction in which the light ray 24 has come from, respectively.

That is why by analyzing the retroreflectivity of the light ray that is going to enter the metal layer 21 with the MCCA shape, the retroreflectivity of the light ray that has entered the display device 100 can be known, and the black display mode property of the display device 100 can be analyzed.

Figure 5A:
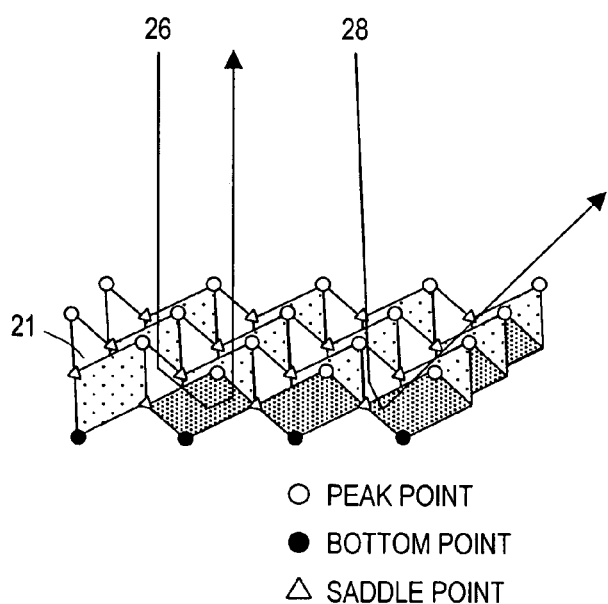
FIGS. 5A and 5B are respectively a perspective view and a plan view showing to which directions the light rays that have entered an MCCA are reflected.

Thus, it will be described first with reference to FIGS. 5A and 5B to which directions the light ray that has entered the metal layer 21 with the MCCA shape is reflected. In the following example, the metal layer 21 is supposed to be the surface of a cubic corner cube array in which each corner cube is defined by three substantially square planes that are opposed almost perpendicularly to each other.

Figure 5B:
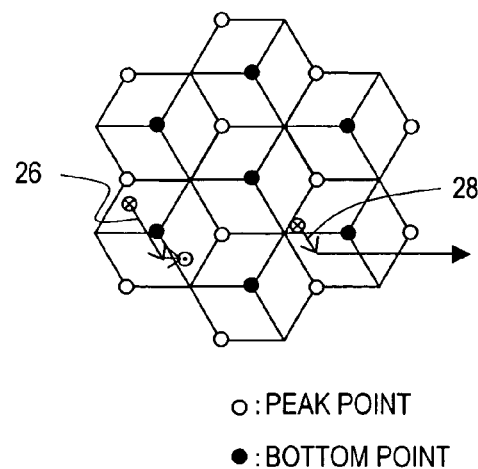

If the metal layer 21 defines the MCCA shape highly accurately, then a light ray 26 that has been incident perpendicularly onto a virtual plane is sequentially reflected by the three planes of a corner cube including the incidence point of the light ray 26 (which will be referred to herein as an "incident corner cube") to be reflected back toward its source as shown in FIG. 5B.

On the other hand, if another light ray 28 has been incident onto the retroreflective layer non-perpendicularly (i.e., so as to define a tilt angle of just a few degrees with respect to a normal to the retroreflective layer), then the light ray 28 is sequentially reflected from two of the three planes of the incident corner cube but is neither incident onto the other plane nor reflected back toward its source as shown in FIG. 5B. Such a light ray that has been reflected from only two out of the three planes of an incident corner cube will be referred to herein as a "twice reflected light ray".

Even if the incoming light ray has entered an MCCA perpendicularly to the virtual plane, such a twice reflected light ray may still be produced in a situation where the MCCA has low shape accuracy (in terms of normal angle and degree of planarity, for example).

Figure 6:
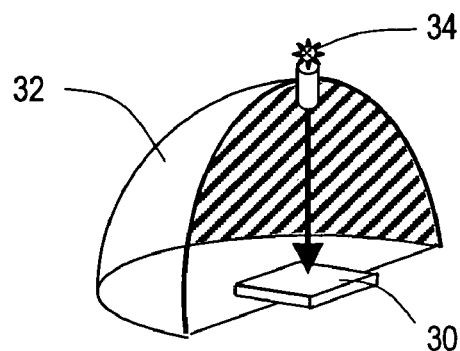
FIG. 6 is a schematic representation illustrating a system for measuring the intensity distribution of the light reflected by an MCCA.

By using an optical system such as that shown in FIG. 6, the present inventors worked out the intensity distribution of light rays that were reflected by an MCCA and tracked the directions in which the twice reflected light ray had gone. The method of this measurement and its results will be described below.

A cubic corner cube array with low shape accuracy, of which the corner cubes had some errors in normal angle, degree of planarity and so on and which were arranged at a pitch of 12 μm, was subjected to the measurement. More specifically, a light ray emitted from a light source 34 was directed perpendicularly to a retroreflector 30 with such a corner cube array and the outgoing direction (represented by the azimuth and polar angle) thereof was measured on a celestial globe as shown in FIG. 6.

Figure 7A:
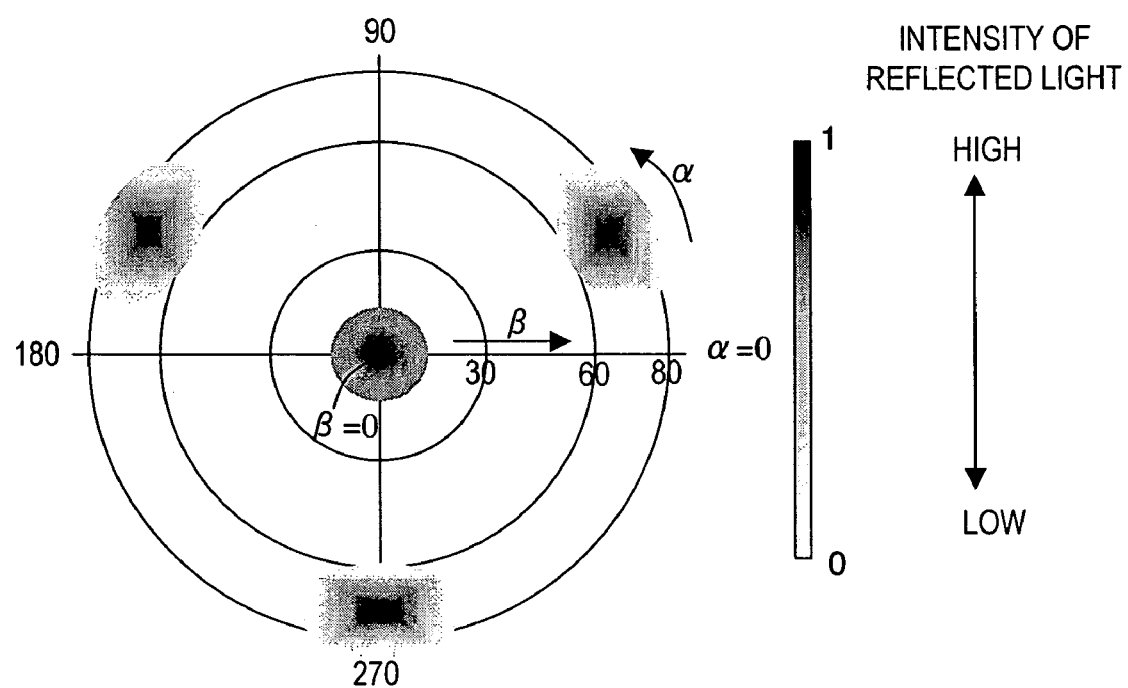
FIG. 7A shows the resultant intensity distribution of the light reflected by the MCCA.

FIG. 7A shows the intensity distribution of the reflected light that was obtained as a result of the measurement. The outgoing direction of the reflected light ray is represented by an azimuth angle α on the virtual plane of the MCCA and a polar angle β with respect to a normal to the virtual plane as will be described later.

Figure 7B:
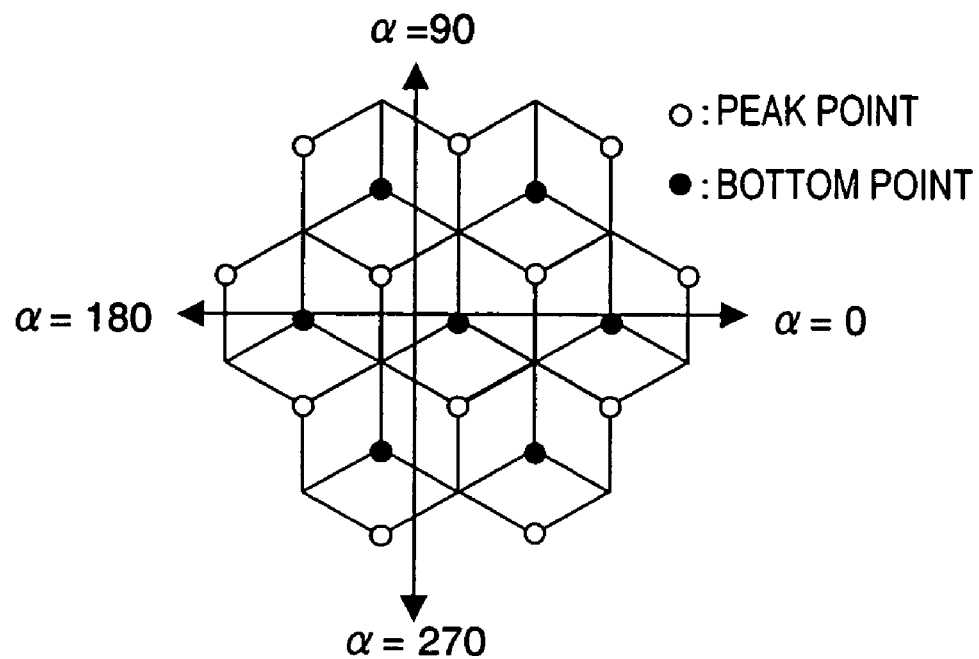
FIG. 7B is a plan view showing azimuth angles in the MCCA.

As shown in FIG. 7B, the azimuth angle α is defined counterclockwise on a plan view of the retroreflector 30 by setting the shortest line that connects together the bottom points of two adjacent corner cubes as a reference direction (i.e., zero degrees). The polar angle β is the angle formed between the outgoing direction of the reflected light ray and a normal to the retroreflector 30 (i.e., the zenith direction in which the light source 34 is located). And the magnitude of the polar angle β is represented by the distance from the center. In FIG. 7A, three circles representing situations where β is 30 degrees, 60 degrees and 80 degrees, respectively, are shown. Also, in the intensity distribution shown in FIG. 7A, the lower the brightness (i.e., the closer to black), the higher the intensity of the reflected light.

In FIG. 7A, the brightness is relatively low at the four points where the azimuth angle α and the polar angle β are (α=0, β=0), (α=30, β=71), (α=150, β=71) and (α=270, β=71), respectively. Thus, it can be seen that relatively intense light rays are reflected in these directions.

Among these reflected light rays, the intense light ray that is reflected in the zenith direction of the retroreflector 30 (represented by (α=0, β=0)) is a retroreflected light ray that has been emitted from the light source 34 and then reflected back in the same direction toward its source 34. It should be noted that it is difficult to accurately measure the intensity of that light ray reflected toward the zenith by using the optical system shown in FIG. 6. That is why the intensity of the light ray reflected in the zenith direction (α=0, β=0) was corrected herein by a measuring system.

The intense light rays that are reflected in the three other directions are twice reflected light rays described above. These twice reflected light rays are observed in three directions pointed from the bottom point of a corner cube toward the peak point thereof (i.e., α=30 degrees, 150 degrees and 270 degrees) and having a polar angle β of approximately 71 degrees.

Taking these results into consideration, it can be confirmed that the twice reflected light ray is reflected in an azimuthal direction that is pointed from the bottom point of the incident corner cube toward the peak point thereof (located on the other plane that the twice reflected light ray has never entered) on the virtual plane of the MCCA as shown in FIG. 5B.

The results of measurements shown in FIG. 7A show in which directions the twice reflected light rays went when the light was incident perpendicularly onto the virtual plane. These results also suggest that if a light ray is incident from the outgoing direction of these twice reflected light rays (represented by the azimuth angle α and the polar angle β) onto the retroreflector 30, then the incoming light ray will be reflected from only two planes of a corner cube and then go perpendicularly to the retroreflector 30. That is to say, it can be seen that even if the viewer is facing the display panel squarely, such a light ray that has entered the retroreflector 30 from the outgoing direction of the twice reflected light rays (which will be referred to herein as a "twice reflected direction") also enters his or her eyes, thus causing the dark-state leakage or grayscale inversion during the black display mode.

Figure 8:
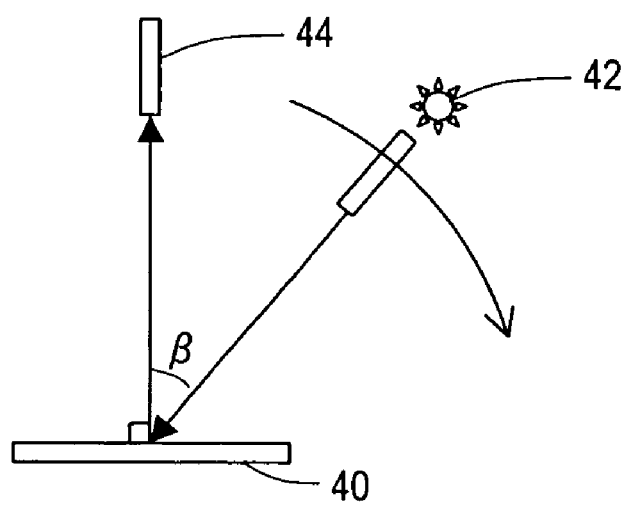
FIG. 8 is a schematic representation illustrating a system for measuring the reflectivity characteristic of a display device.

The present inventors made a sample display device with the configuration shown in FIG. 4 and measured the reflectivity using a measuring system such as that shown in FIG. 8.

The measurements were carried out as follows. Specifically, a light ray emitted from a light source 42 was directed toward the sample display device 40 and its reflected light was received at a photodetector 44. The photodetector 44 was arranged so as to receive a light ray that had been reflected perpendicularly to the display panel of the sample display device 40 (represented by (α=0, β=0)). Meanwhile, the light source 42 was arranged such that the light emitted from the light source 42 would enter the display panel from the directions in which the azimuth angle α was fixed and the polar angle β (i.e., the angle of incidence) was changed within the range of 25 to 85 degrees.

Figure 9A:
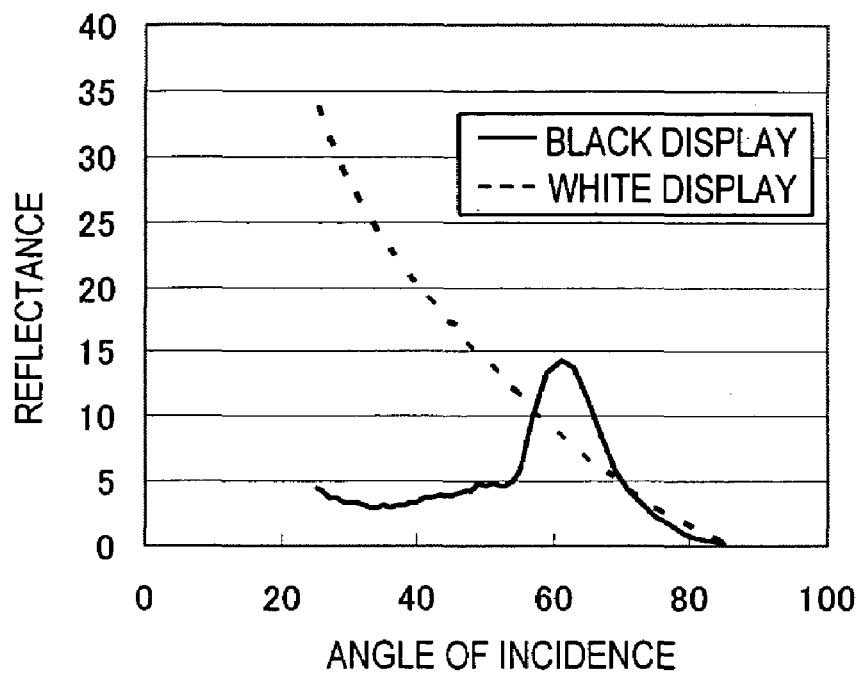
FIG. 9A is a graph showing the reflectivity characteristic of a display device in a situation where light has come from the azimuthal direction of a twice reflected direction.
Figure 9B:
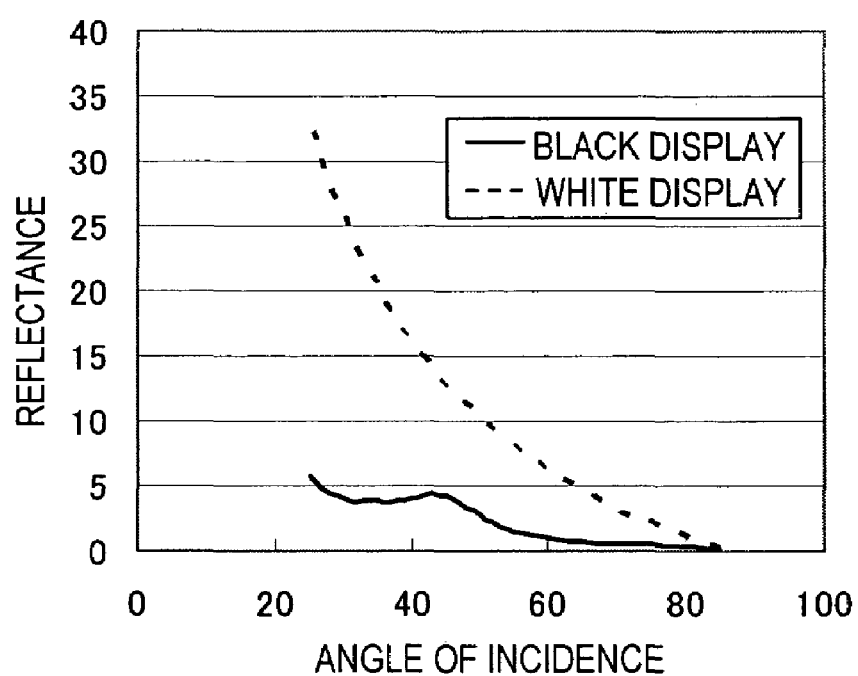
FIG. 9B is a graph showing the reflectivity characteristic of a display device in a situation where light has come from the direction that has shifted 60 degrees from the azimuthal direction of a twice reflected direction.

The results of the reflectivity characteristics evaluated are shown in FIGS. 9A and 9B. More specifically, FIG. 9A shows the results of measurements in a situation where the azimuth angle α defined by the incoming direction of the light was set equal to the azimuth angle defined by the direction pointed from the bottom point of a corner cube in the sample display device 40 toward the peak point thereof (i.e., α=30 degrees, 150 degrees or 270 degrees). This azimuth angle is equal to that defined by the direction in which the twice reflected light rays are observed as shown in FIG. 7A (i.e., the twice reflected direction). On the other hand, FIG. 9B shows the results of measurements in a situation where the azimuth angle α defined by the direction of the incoming light ray was set by rotating the azimuth angle of the incoming direction shown in FIG. 9A 60 degrees (i.e., α=90 degrees, 210 degrees or 330 degrees).

As can be seen from FIGS. 9A and 9B, the reflectivity characteristic in the white display mode is determined by the property of the liquid crystal layer of the sample display device 40, and therefore, hardly changes irrespective of the azimuth angle α. On the other hand, the reflectivity characteristic in the black display mode is changeable significantly with the azimuth angle α.

In a situation where the azimuth angle α defined by the incoming direction is equal to that defined by the twice reflected direction as shown in FIG. 9A, if the polar angle β defined by the incoming direction (i.e., the angle of incidence) is small, then the reflectivity is low in the black display mode. However, if the polar angle β is increased to the vicinity of 60 degrees, then the reflectivity increases steeply. And if the polar angle β is equal to or greater than 60 degrees, the reflectivity in the black display mode will be approximately equal to or higher than that in the white display mode. That is why if light is incident from the directions in which the azimuth angle α is 30 degrees, 150 degrees or 270 degrees and the polar angle β is large (i.e., a direction that is tilted significantly from the direction perpendicular to the display panel) and if the viewer is facing the display panel squarely, then slightly lightened black will be displayed, the black and white portions of the image will have inverted brightnesses on the screen and/or the contrast ratio of the display will decrease. In FIG. 9A, when the reflectivity is the highest in the black display mode, the polar angle β defined by the incoming direction is around 60 degrees, which does not agree with the polar angle β of approximately 71 degrees of the twice reflected direction shown in FIG. 7A. This should be an error caused by this measurement. On the other hand, if the azimuth angle α defined by the incoming direction is significantly different from the azimuth angle α defined by the twice reflected direction as shown in FIG. 9B, then the reflectivity in the black display mode is kept low irrespective of the polar angle β defined by the incoming direction. As a result, no dark-state leakage or any other deterioration in display quality will be caused.

Taking these results into consideration, if the viewer is facing the display panel squarely, no dark-state leakage or grayscale inversion will be caused by the twice reflected light ray unless the light source is arranged in the twice reflected direction. That is why to minimize the dark-state leakage and the grayscale inversion, the display device is preferably designed such that the azimuth angle defined by the direction of the light ray that is going to enter the display panel does not agree with the azimuth angle defined by the twice reflected direction.

According to the present invention, the dark-state leakage and grayscale inversion can be reduced in view of the viewing angle direction (i.e., the position of the viewer) of the display device based on the findings of these experiments and measurements.

Embodiment 1

Hereinafter, a display device according to a first preferred embodiment of the present invention will be described with reference to the accompanying drawings. The display device of this preferred embodiment is a reflective display device that has an MCCA attached structure and in which the gap between the rear substrate of the display panel and the retroreflective layer with the MCCA shape is filled with a gas having a refractive index of about 1.00.

FIG. 10A is a schematic cross-sectional view illustrating a configuration for the reflective display device of this preferred embodiment. As can be seen from FIG. 10A, the display device of this preferred embodiment has substantially the same configuration as the display device 100 shown in FIG. 4. In FIG. 10A, any component having almost the same function as the counterpart shown in FIG. 4 will be identified by the same reference numeral for the sake of simplicity and the description thereof will be omitted herein. FIG. 10B is a plan view of the retroreflective layer 2 of this preferred embodiment.

As shown in FIG. 10B, the surface of the retroreflective layer 2 of this preferred embodiment has an MCCA shape on which multiple corner cubes, each being defined by three substantially square planes (i.e., fx, fy and fz planes) that are opposed perpendicularly to each other, are arranged two-dimensionally on a virtual plane. The MCCA shape of the retroreflective layer 2 has some errors in the degree of planarity and normal angle of those planes that form the corner cubes. That is why if a light ray is incident perpendicularly onto the retroreflective layer 2, the light reflected from the MCCA has an intensity distribution such as that shown in FIG. 7A.

In this preferred embodiment, the retroreflective layer 2 is arranged such that an azimuthal direction, which is defined by projecting the twice reflected direction (or vector) described above onto a virtual plane, and another azimuthal direction, which is defined by projecting an on-screen downward direction (or vector) onto the virtual plane, form an angle ω of at most 30 degrees.

The arrangement of the retroreflective layer 2 of this preferred embodiment will be described more structurally. If the retroreflective layer 2 has a cubic corner cube array shape, then the azimuth angle defined by projecting a normal (vector) to one of the three planes of a corner cube onto a virtual plane and any of the azimuth angles defined by the twice reflected direction (i.e., a vector pointing from the bottom point toward the peak point) form an angle of 180 degrees between them. Even if the retroreflective layer 2 has an MCCA with a non-cubic corner cube array shape, the azimuth angle defined by projecting a normal to one of the three planes of a corner cube onto a virtual plane and any of the azimuth angles defined by the twice reflected direction of the MCCA shape also form an angle of 180 degrees between them as long as the MCCA has high shape accuracy. That is why if the retroreflective layer 2 is arranged such that an azimuthal direction, which is defined by projecting a normal (vector) to one of the three planes of a corner cube onto a virtual plane, and another azimuthal direction, which is defined by projecting an on-screen upward direction (vector) of the display device onto the virtual plane, form an angle γ of at most 30 degrees, then the angle ω can be reduced to 30 degrees or less.

Next, it will be described in further detail what the "on-screen directions", "angle ω" and "angle γ" mean in this description.

Figure 11A:
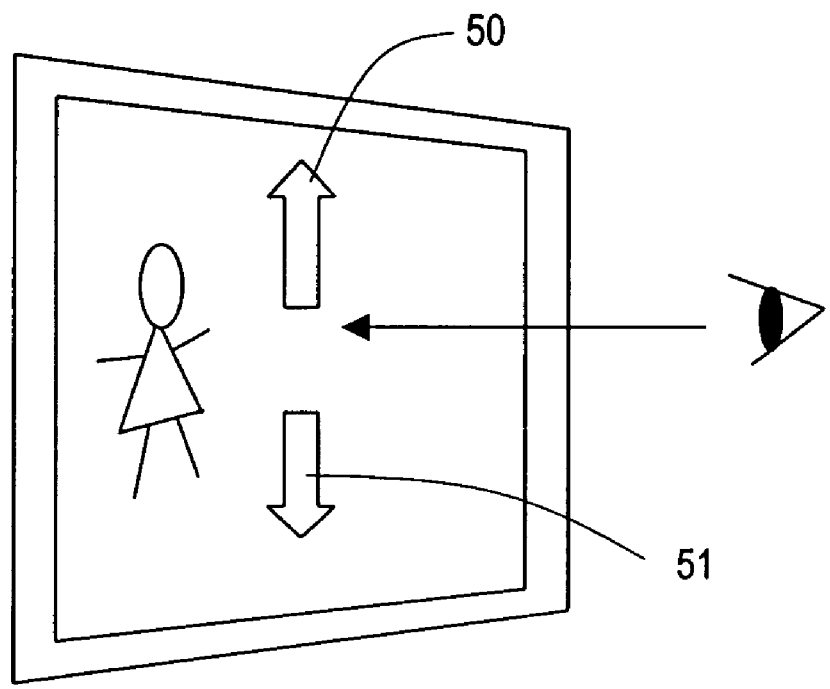
FIGS. 11A and 11B illustrate viewing angle directions of a display device.
Figure 11B:
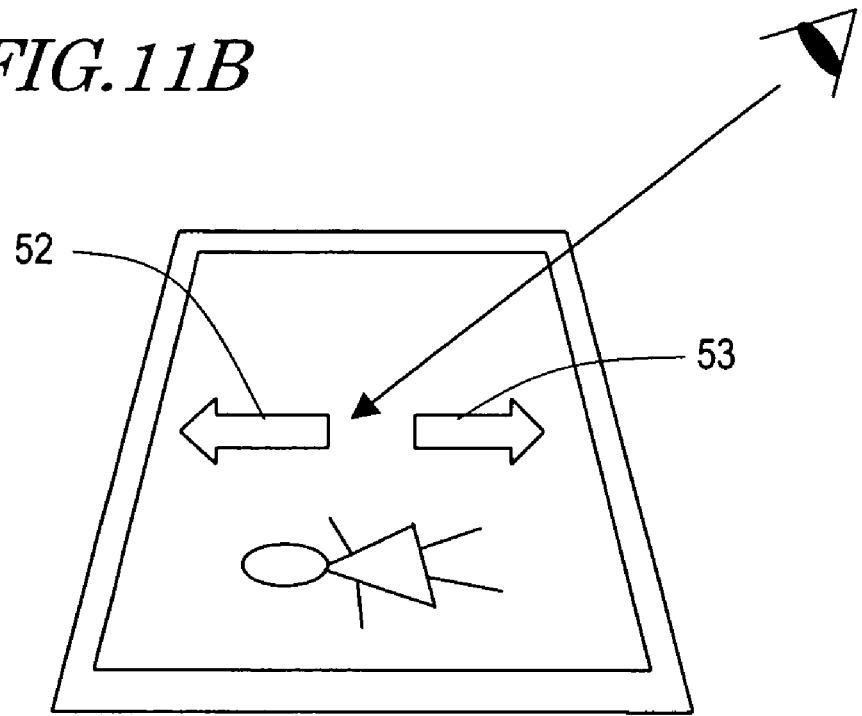

FIGS. 11A and 11B show how the on-screen directions are defined in this description. As shown in FIG. 11A, if the viewer is facing the screen of a display panel 15 substantially squarely, then the vertically upward direction 50 for him or her (i.e., the twelve-o'clock direction) will be referred to herein as an "on-screen upward direction" and the vertically downward direction 51 for him or her (i.e., the six-o'clock direction) will be referred to herein as an "on-screen downward direction". Also, as shown in FIG. 11B, if the viewer is watching the screen from a direction that forms some tilt angle with respect to a normal to the display panel 15, then the direction 52 pointed from his or her side toward the other side (i.e., the twelve-o'clock direction) will also be referred to herein as the "on-screen upward direction" and the direction 53 pointed from the other side toward his or her side (i.e., the six-o'clock direction) will also be referred to herein as the "on-screen downward direction".

Figure 12A:
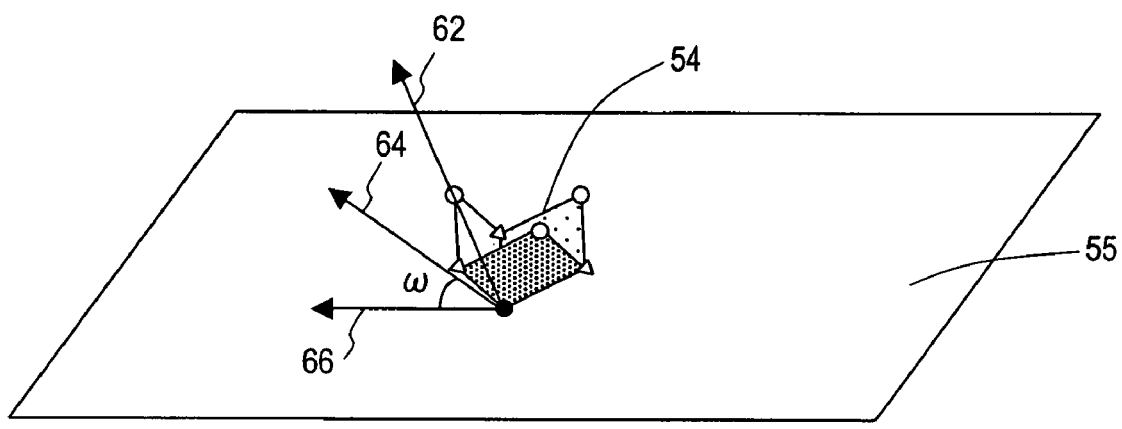
FIG. 12A shows how an angle ω is formed between an azimuthal direction, defined by projecting a twice reflected direction on a virtual plane, and an on-screen downward direction.

FIG. 12A shows how the angle ω is defined herein.

As described above, the retroreflective layer 2 has a number of corner cubes (unit structures) 54 that are arranged on a virtual plane 55. On the MCCA consisting of those corner cubes 54, if a twice reflected direction 62 is projected onto the virtual plane 55, then the azimuthal direction 64 is defined by the twice reflected direction 62 on the virtual plane 55. On the other hand, if the on-screen downward direction that has been described with reference to FIGS. 11A and 11B is projected onto the virtual plane 55, then the azimuthal direction 66 is defined by the on-screen downward direction on the virtual plane 55. In a display device, the virtual plane 55 of the retroreflective layer 2 and the display panel 15 are usually arranged parallel to each other. That is why the direction 66 is typically identical with the on-screen downward direction. The angle formed between the azimuthal direction 64 of the twice reflected direction 62 and the on-screen downward direction 66 will be referred to herein as the "angle ω". In the example illustrated in FIG. 12A, the corner cube 54 is supposed to be a cubic corner cube, and therefore, the twice reflected direction is pointed from the bottom point of the corner cube toward the peak point thereof (see FIGS. 7A and 7B). However, the twice reflected direction is defined by the shape of the corner cube 54 and is not limited to the direction 62 shown in FIG. 12A.

Figure 12B:
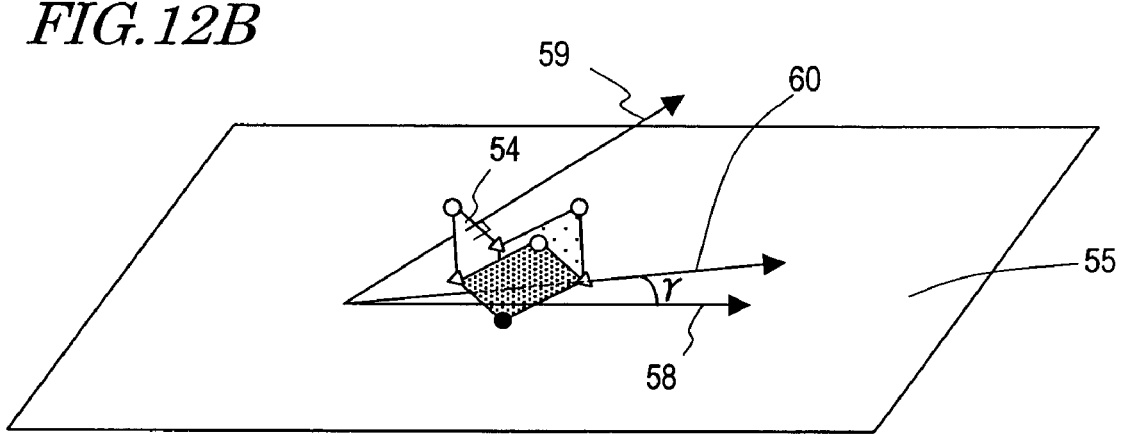
FIG. 12B shows how an angle γ is formed between an azimuthal direction, defined by projecting a normal to one of the three planes of a corner cube onto a virtual plane, and an on-screen upward direction.

FIG. 12B shows how the angle γ is defined herein and illustrates a corner cube (unit structure) 54 arranged on the virtual plane 55 as in FIG. 12A. If a normal (vector) 59 to one of the three planes of the corner cube 54 is projected onto the virtual plane 55, the azimuthal direction 60 is defined by the normal 59 on the virtual plane 55. On the other hand, if the on-screen upward direction is projected onto the virtual plane 55, the azimuthal direction 58 is defined by the on-screen upward direction on the virtual plane 55. In a display device, the virtual plane 55 of the retroreflective layer 2 and the display panel 15 are usually arranged parallel to each other. That is why the direction 58 is typically identical with the on-screen upward direction. The angle formed between the azimuthal direction 60 defined by the normal 59 and the on-screen upward direction 58 will be referred to herein as the "angle $\gamma$".

Since the retroreflective layer 2 of this preferred embodiment is arranged as described above, the direction pointing either downward or toward the viewer's side (i.e., the on-screen downward direction) substantially agrees with one of the twice reflected directions. As a result, the quantity of light that is going to enter the display panel 15 from one of the twice reflected directions can be cut down, and therefore, the effect caused by the twice reflected light can be reduced to about two-thirds of the conventional one. The reason will be described more fully with reference to the accompanying drawings.

Figure 13A:
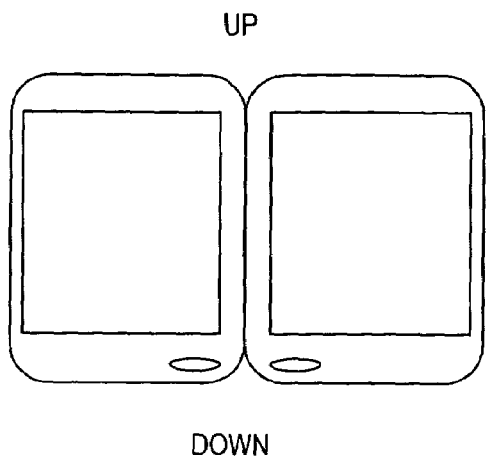
FIGS. 13A and 13B illustrate an arrangement of a retroreflective layer according to the first preferred embodiment.
Figure 13B:
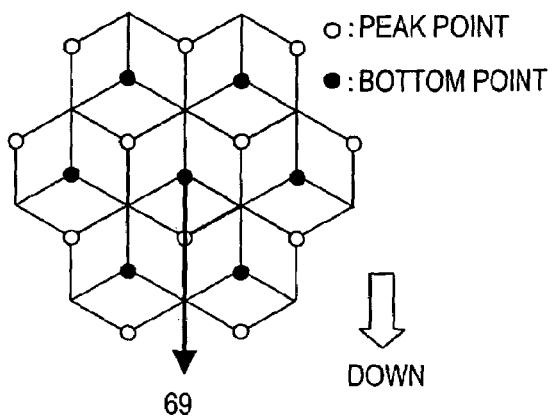

FIG. 13A is a plan view illustrating the display panel of a display device such as an electronic book and FIG. 13B is an enlarged plan view illustrating the arrangement of the retroreflective layer in the display device shown in FIG. 13A. In this display device, the retroreflective layer is arranged such that the azimuthal direction 69 of one of the twice reflected directions substantially agrees with the on-screen downward direction (i.e., such that $\omega \leqq 30$ degrees or $\gamma \leqq 30$ degrees is satisfied) as shown in FIG. 13B. If this display device is put horizontally under a diffused light source and if the viewer is watching its screen from a direction that defines a tilt angle with respect to a normal to the display panel 15 as shown in FIG. 11B, then the light that is going to enter the display panel 15 from one of the twice reflected directions is cut off by the viewer himself or herself. On the other hand, if this display device is put vertically under a diffused light source and if the viewer is facing the screen of the display panel 15 squarely as shown in FIG. 11A, then one of the twice reflected directions will point toward the floor where no light sources are usually present. As a result, the quantity of light that is going to enter the display panel 15 from this direction can be cut down. Also, even if the viewer is watching the screen of the display device in an environment where there is an intense point light source, the probability of agreement between the direction of the point light source and one of the twice reflected directions can be reduced to two-thirds of the conventional one.

To reduce the effect that would be caused by the twice reflected light with more certainty, the azimuthal direction defined by projecting the twice reflected direction on the virtual plane and the azimuthal direction defined by projecting the on-screen downward direction on the virtual plane preferably form an angle $\omega$ of 25 degrees or less. Also, the azimuthal direction defined by projecting a normal to one of the three planes of a corner cube onto the virtual plane and the azimuthal direction defined by projecting the on-screen upward direction onto the virtual plane preferably form an angle $\gamma$ of 25 degrees or less.

The present inventors carried out experiments with a display device having a screen size of 10 inches or more put in an environment where there was a light source behind the viewer at least. As a result, we discovered that either the angle $\omega$ or the angle $\gamma$ was preferably 12 degrees or less. These experiments and their results will be described more fully below.

Suppose a viewer with a breadth of 40 cm across the shoulders is watching a panel with a screen size of 10 inches (with dimensions of 15.2 cm×20.3 cm), which is arranged on a horizontal plane in front of him or her. Also, the distance from the lower side of the panel to the viewer's chest is supposed to be 30 cm. In that case, if the twice reflected direction has hardly shifted from the on-screen downward direction (i.e., if the angle $\omega$ is small), then external light that has come from the twice reflected direction can be cut off by his or her shoulders. However, if the angle $\omega$ has increased so much that the twice reflected direction becomes parallel to the direction pointed from the upper right corner (or the end of the right-hand-side edge) of the panel toward his or her right shoulder edge on the horizontal plane on which the panel is placed, part of the external light directed from over his or her right shoulder edge toward the upper right corner of the panel enters the panel, is reflected twice, and then reaches his or her eyes. In such a situation, the angle $\omega$ formed between the twice reflected direction and the on-screen downward direction calculates 12 degrees when the twice reflected direction becomes parallel to the direction pointed from the upper right corner of the panel toward his or her right shoulder edge. Thus, it can be seen that on these suppositions, the angle $\omega$ is preferably reduced to 12 degrees or less to cut off the external light that is going to enter the panel from one of the twice reflected directions just as intended. The present inventors also used a display device with a panel of a bigger size and did not arrange the panel in front of the viewer. Then, we discovered that the angle $\omega$ was preferably even smaller than 12 degrees. Consequently, although it depends on the size of the display device and its operating environment, the angle $\omega$ (and therefore the angle $\gamma$) should be 12 degrees or less to minimize the dark-state leakage, caused by the external light that has come from behind the viewer, more effectively.

Ideally, the angle $\omega$ or the angle $\gamma$ is substantially equal to zero degrees. In that case, the effect caused by the twice reflected light can be reduced significantly and even better display quality is achieved irrespective of the size of the display device or its operating environment.

In this manner, according to this preferred embodiment, the arrangement of the retroreflective layer 2 is adjusted with respect to the viewing angle direction with the light reflected twice by the MCCA taken into consideration, and therefore, the display quality can be improved without complicating the manufacturing process excessively. Various configurations for a display device with a retroreflective layer have already been proposed so far as mentioned above. But none of them has paid such special attention to this arrangement. Also, Japanese Patent Application Laid-Open Publication No. 2003-195788, which was filed by the applicant of the present application, discloses a configuration in which the arrangement pattern of corner cubes and that of reflective electrodes are matched with each other in order to increase the aperture ratio. However, this patent publication is silent about how the arrangement pattern of corner cubes should be adjusted with respect to the viewing angle direction.

Figure 1A:
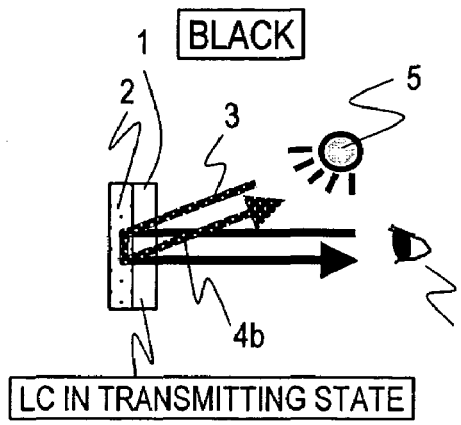
FIGS. 1A and 1B illustrate the operating principle of a reflective liquid crystal display device in which a scattering liquid crystal display mode is combined with a retroreflector.
Figure 1B:
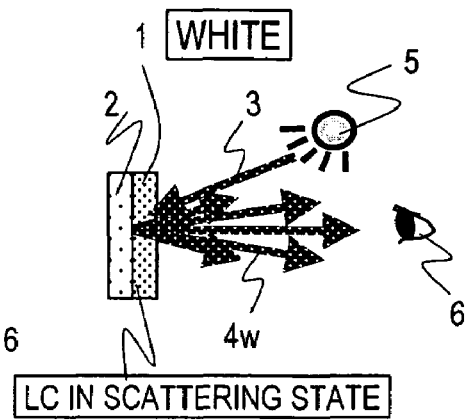
Figure 2A:
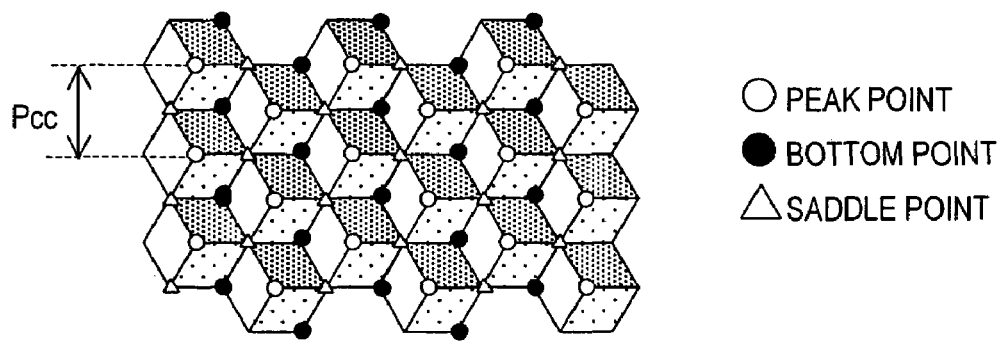
FIGS. 2A and 2B are respectively a plan view and a perspective view illustrating the configuration of a corner cube array.
Figure 2B:
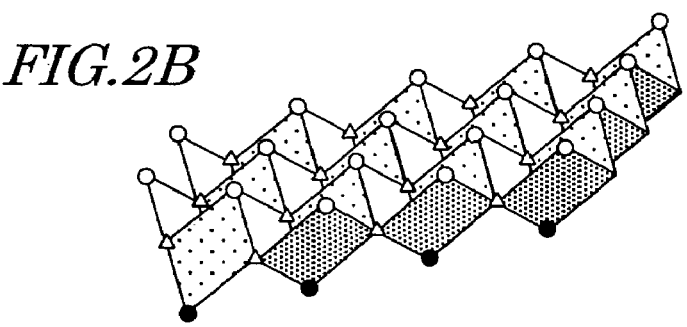
Figure 3A:
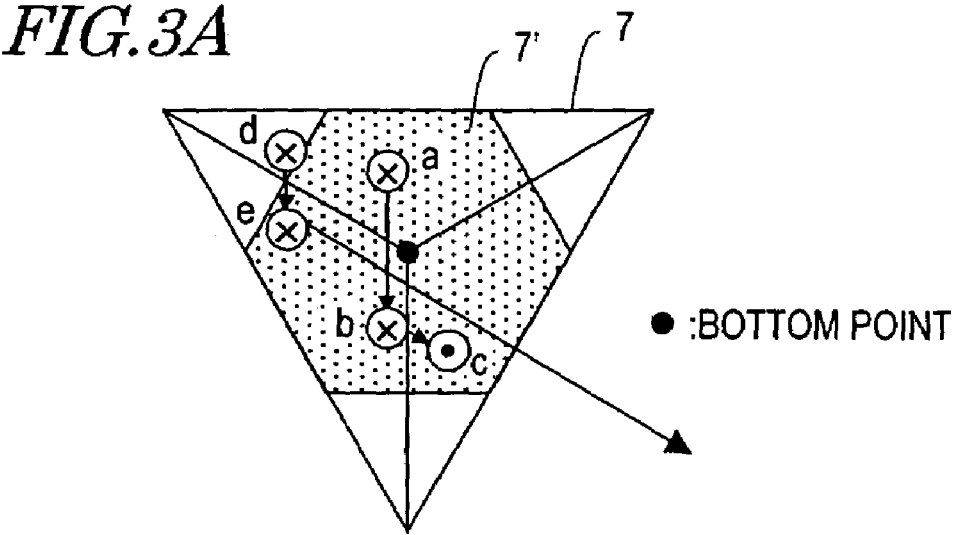
FIGS. 3A, 3B and 3C are top views illustrating the unit structures (corner cubes) of MCCA Nos. 1, 2 and 3, respectively.
Figure 3B:
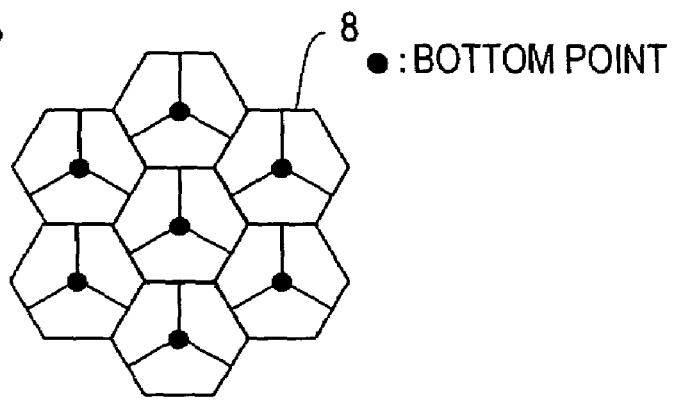
Figure 3C:
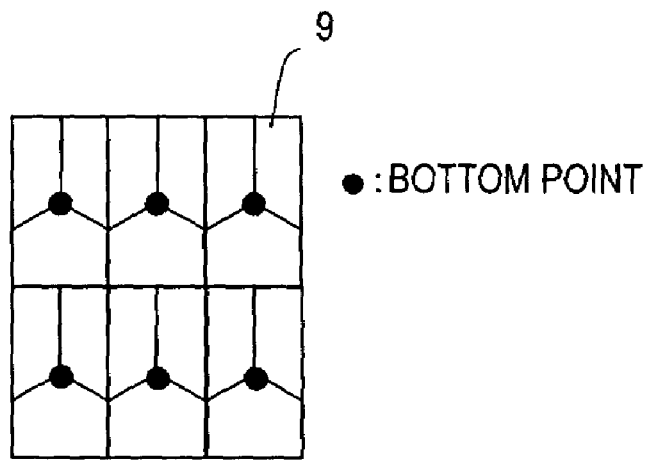

Each unit structure (i.e., corner cube) of the retroreflective layer 2 does not have to be a cubic corner cube but may also be a corner cube consisting of three triangular planes (or planes of any other shape) that are opposed perpendicularly to each other. Anyway, these unit structures are preferably arranged in the retroreflective layer 2 so as to face substantially the same direction. In that case, the twice reflected directions defined by those unit structures can be identical with each other. As a result, the effects caused by the twice reflected light can be reduced even more significantly. Examples of such retroreflective layers consisting of unit structures that face substantially the same direction include not only the cubic corner cube array described above but also corner cube arrays such as those shown in FIGS. 3B and 3C. Furthermore, the shape and arrangement pitch of the corner cubes (unit structures) in the retroreflective layer 2 are not particularly limited, either. However, in order to make the array function as a retroreflective layer, the overall size of the array is preferably not greater than the pupil size of human beings (e.g., 5 mm or less).

In the preferred embodiment described above, the retroreflective layer has an MCCA consisting of planes, of which the degrees of planarity and normal angles contain some errors. Alternatively, the retroreflective layer may naturally have an MCCA with excellent shape accuracy. Even so, the deterioration in display quality due to the twice reflected light can also be minimized.

Figure 14A:
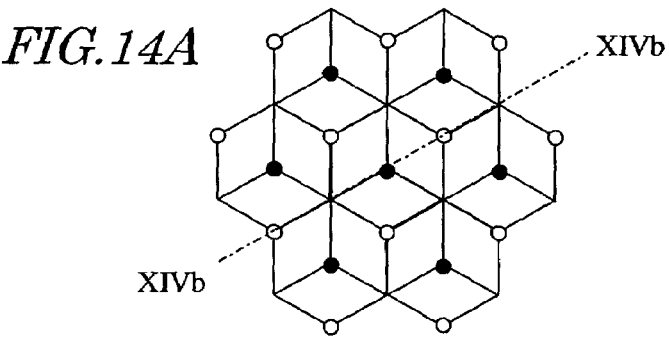
FIGS. 14A and 14B are respectively a plan view of a retroreflective layer and a cross-sectional view thereof as viewed on the plane XIVb—XIVb to show a light ray that has been reflected twice by an MCCA with high shape accuracy.
Figure 14B:
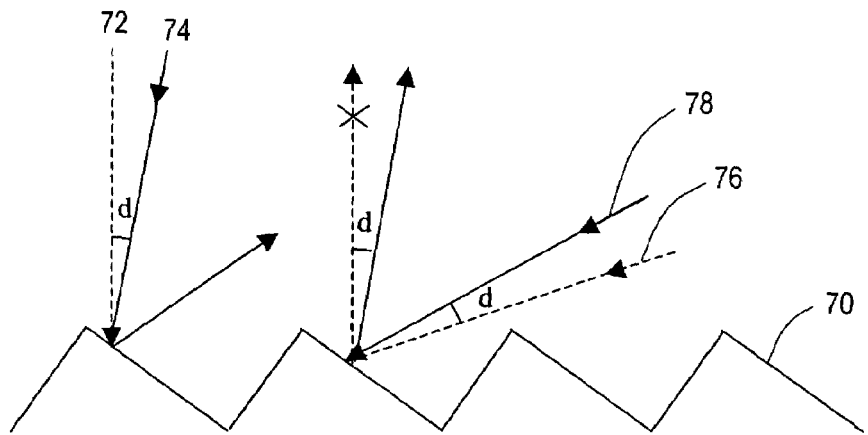

Hereinafter, it will be described in detail with reference to the accompanying drawings what the twice reflected light is like if the MCCA has high shape accuracy. FIG. 14A is a plan view of a retroreflective layer with an MCCA shape. FIG. 14B is a cross-sectional view of the retroreflective layer shown in FIG. 14A as viewed on the plane XIVb—XIVb that has an azimuth angle α of 30 degrees and that is defined perpendicularly to the virtual plane. Optionally, the azimuth angle α of the plane XIVb—XIVb may also be 150 degrees or 270 degrees.

If the surface 70 of the retroreflective layer has very good shape accuracy (e.g., has an ideal MCCA shape), then a light ray 72 that has been incident perpendicularly onto such a retroreflective layer is reflected by three planes of the surface 70 back toward its source. Accordingly, it is theoretically impossible that a light ray 76 that has come from a particular direction is reflected by the surface 70 and then leaves the MCCA perpendicularly to the retroreflective layer. For example, even if the light ray 76 has come from the direction that is defined by an azimuth angle α of 30 degrees and a polar angle β of 71 degrees, the light ray 76 will never reach the eyes of the viewer who is located right in front of the display panel.

However, part of a light ray 74, which has been incident onto a corner cube around an edge thereof from the direction that defines a tilt angle d of two to three degrees, for example, with respect to a normal to the retroreflective layer, is reflected by only two planes of the corner cube and then goes in a different direction from its incoming direction. If the azimuth angle α of the light ray 74 in its incoming direction is 30 degrees, 150 degrees or 270 degrees, then the azimuth angle α thereof in its outgoing direction will be equal to that in the incoming direction of the light ray 74. But the polar angle β of the light ray 74 in its outgoing direction will shift toward the front of the panel by the angle d compared to the polar angle (of 71 degrees, for example) of the twice reflected direction (i.e., β=71−d degrees). Suppose the light ray 74 is directed toward the retroreflective layer from a direction that defines some tilt angle with respect to the normal to the retroreflective layer to plot the intensity distribution of the reflected light as shown in FIG. 7A. In that case, if the azimuth angle α of the light ray 74 in its incoming direction is 30 degrees, 150 degrees or 270 degrees, then the azimuth angle α of the direction in which the twice reflected light is observed is equal to that of the light in its incoming direction and the polar angle β becomes smaller than 71 degrees.

Thus, it can be seen that the light ray 78 that has come from the outgoing direction of the twice reflected light of the light ray 74 (defined by α=30 degrees and β=71−d, for example) will leave the display panel in the direction that defines the tilt angle d with respect to a normal to the display panel. Consequently, if the viewer is watching the display panel from that direction that defines the tilt angle d with respect to the normal to the display panel (defined by α=30 degrees and β=d), then the twice reflected light of the light ray 78 that has come from a particular direction (defined by α=30 degrees and β=71−d degrees) will reach his or her eyes, thus possibly causing the dark-state leakage (or making the black portions of the image slightly brighter).

If the azimuth angle α of the light ray 74 in its incoming direction is 30 degrees, 150 degrees or 270 degrees, then the polar angle β of the direction in which the twice reflected light is observed will be (71−d) degrees. However, if the azimuth angle α of the light ray 74 in its incoming direction is none of these angles (i.e., different from 30, 150 or 270 degrees by x degrees (where x is equal to or smaller than ±60 degrees)), then the polar angle β of the direction in which the twice reflected light is observed will be greater than (71−d) degrees by y degrees (i.e., β=(71+y)−d). In this case, the magnitude of the angle y is determined by the angle x described above. Typically, the greater the absolute value of the angle x, the greater the angle y tends to be. Consequently, if the viewer is watching the display panel from the direction that defines the tilt angle d with respect to a normal to the display panel (defined by α=30+x and β=d, for example), then the twice reflected light of a light ray that has come from a particular direction (defined by β=(71+y)−d, for example) will enter his or her eyes.

In this preferred embodiment, the retroreflective layer 2 is arranged such that one of the azimuthal directions of the twice reflected directions substantially agrees with the on-screen downward direction. For that reason, even if the retroreflective layer 2 has an ideal MCCA shape, the quantity of light that has come from the twice reflected direction (e.g., the light ray 78) can be reduced. As a result, the deterioration in display quality that could be caused by the twice reflected light when the viewer is watching the display panel obliquely can be minimized. Particularly when the viewer is watching the display panel from a direction that defines a tilt angle of several degrees toward the on-screen upward or downward direction with respect to the direction perpendicular to the display panel, the effects caused by the twice reflected light can be reduced effectively.

In this case, if the retroreflective layer 2 has either the ideal MCCA shape or a quasi-ideal MCCA shape, the twice reflected direction of the MCCA shape could not be detected even by measuring the intensities of reflected light rays by the method that has already been described with reference to FIG. 6. In the optical system shown in FIG. 6, if the light emitted from the light source 34 is not totally parallel light, then twice reflected light will be produced. On the other hand, if the light emitted from the light source 34 is almost parallel light, then most of the light that has been incident perpendicularly onto the retroreflective layer 2 will be retroreflected and the intensity of the twice reflected light decreases significantly. As a result, it becomes difficult to detect the twice reflected direction. In that case, if the light emitted from the light source 34 is directed perpendicularly to the retroreflective layer 2 at a cone angle of one degree or more by using the optical system shown in FIG. 6, then twice reflected light will be produced easily and the intensity distribution of the reflected light such as that shown in FIG. 7A can be obtained. And the twice reflected direction can be detected based on the resultant intensity distribution of the reflected light. As used herein, the "twice reflected direction", i.e., the outgoing direction of a light ray that has been incident perpendicularly onto a virtual plane and then reflected by two planes, is supposed to include the outgoing direction of a light ray that has been incident perpendicularly onto the virtual plane at the cone angle specified above and then reflected by two planes.

As described above, the retroreflective layer 2 of this preferred embodiment may have either a highly accurate MCCA shape made by the method disclosed by the applicant of the present application in Japanese Patent Application No. 2003-366157 or a normal MCCA shape made by a conventional method and having some errors in the degree of planarity, for example. In any case, by applying the idea of the present invention, the effects caused by the twice reflected light can be reduced significantly, and therefore, the display quality can be improved. The retroreflectivity of the retroreflective layer 2 is changeable with the method of making the layer and with its shape accuracy, but is preferably at least 50% because excellent display quality will be achieved in that case.

In the preferred embodiment described above, the gap between the retroreflective layer 2 and the rear substrate 12 is filled with the gas 23, of which the refractive index is substantially equal to that of the air. However, the present invention is in no way limited to this specific preferred embodiment. Alternatively, any other configuration may be adopted as long as the angle of incidence $\theta_A$ of a light ray on the display panel is substantially equal to the angle of incidence $\theta_B$ of the light ray on the MCCA of the retroreflective layer 2. That is why the surface of the MCCA may be in contact with a layer of a gas, a liquid or a solid having a refractive index of 1 to less than 1.06 (i.e., a low refractive index layer).

Embodiment 2

Hereinafter, a display device according to a second preferred embodiment of the present invention will be described with reference to the accompanying drawings. The display device of this preferred embodiment is a reflective display device having an MCCA attached structure.

Figure 15:
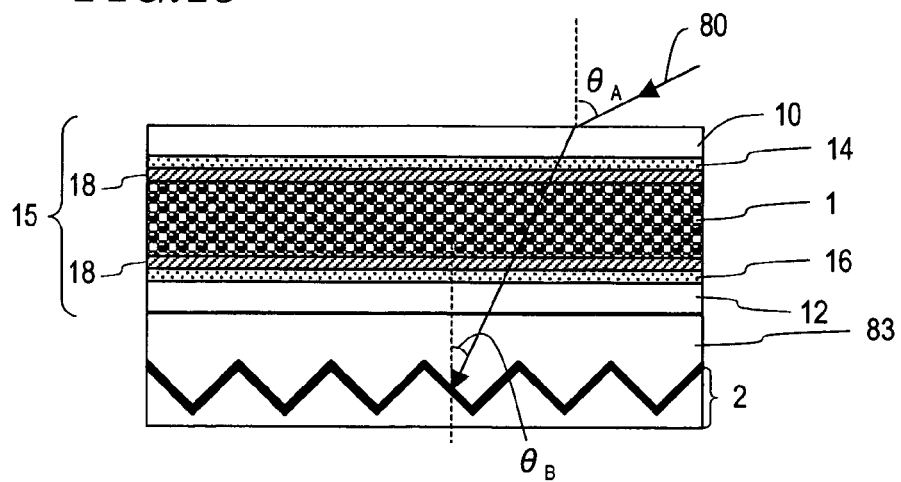
FIG. 15 is a schematic cross-sectional view illustrating a configuration for a reflective display device according to a second preferred embodiment of the present invention.

FIG. 15 is a schematic cross-sectional view illustrating a configuration for a reflective display device according to this preferred embodiment. The reflective display device of this preferred embodiment has almost the same configuration as the counterpart of the first preferred embodiment that has already been described with reference to FIG. 10A except that the gap between the rear substrate 12 of the display panel and the retroreflective layer 2 is filled with a liquid or solid 83 having a refractive index of 1.06 or more. In this preferred embodiment, a resin 83 with a refractive index of 1.5 is used as the liquid or solid. Although not shown, the retroreflective layer 2 of this preferred embodiment also has the MCCA shape shown in FIG. 10B. In FIG. 15, any component having almost the same function as the counterpart shown in FIG. 10A will be identified by the same reference numeral for the sake of simplicity and the description thereof will be omitted herein.

In this preferred embodiment, in the black display mode, a light ray 80 that has been incident onto the front substrate 10 is transmitted through the display panel, retroreflected by the MCCA on the surface of the retroreflective layer 2, passed through the display panel again and then directed back toward its source. In this case, the light ray 80 is refracted when entering the front substrate 10 from the air, transmitted through the display panel made of a material having a refractive index of about 1.5 and then incident onto the retroreflective layer 2 by way of the resin 83. That is why the angle of incidence (i.e., polar angle) $\theta_B$ of the light ray 80 that has impinged on the metal layer 21 through the resin 83 becomes smaller than the angle of incidence $\theta_A$ of the light ray 80 that has impinged on the front substrate 10 from the air.

Figure 16A:
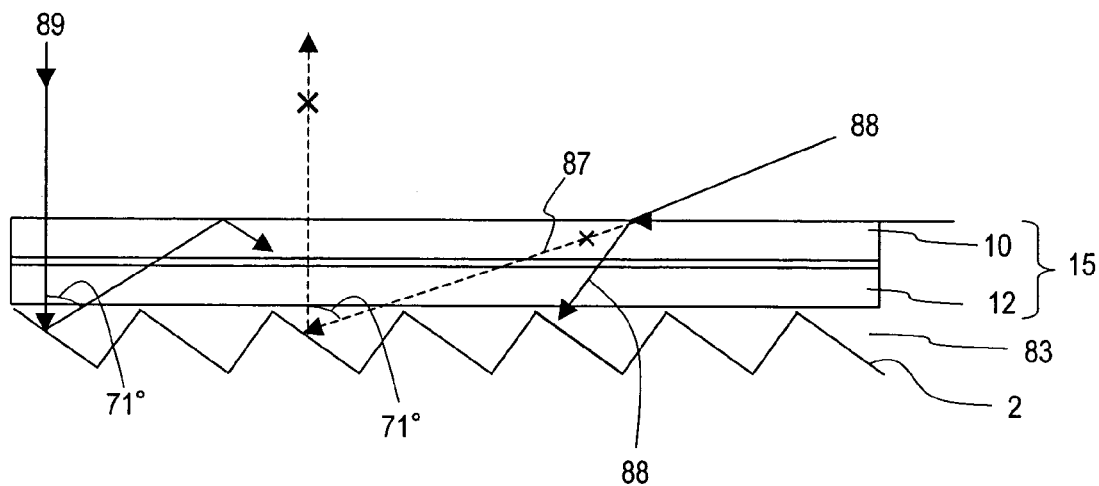
FIGS. 16A and 16B are cross-sectional views showing what effects are caused by twice reflected light in the reflective display device of the second preferred embodiment.
Figure 16B:
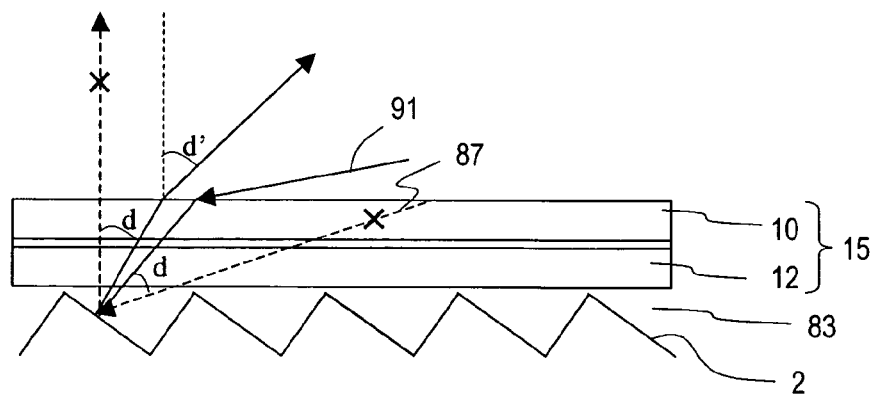

Hereinafter, it will be described in detail what effects are caused by the twice reflected light on the reflective display device of this preferred embodiment. FIGS. 16A and 16B are cross-sectional views of the reflective display device of this preferred embodiment as viewed on a plane that is perpendicular to the virtual plane and that is parallel to another plane including the twice reflected direction.

First, a situation where the viewer is facing the display panel of this reflective display device squarely will be described with reference to FIG. 16A. If a light ray 87 needed to be incident on the retroreflective layer 2 from the twice reflected direction of the MCCA (defined by $\alpha=30$ degrees and $\beta=71$ degrees, for example), then the light ray 87 should come from a direction having a polar angle $\theta_A$ that is greater than 90 degrees. Actually, however, no light can come from such a direction. Also, even if a light ray is directed toward the front substrate 10 from the twice reflected direction (defined by $\alpha=30$ degrees and $\theta_A=71$ degrees, for example), the angle of incidence $\theta_B$ of the light ray 88 on the retroreflective layer 2 becomes smaller than the polar angle of the twice reflected direction (i.e., $\theta_B<71$ degrees) because the light ray has been refracted, and therefore, the light ray will not leave the display panel perpendicularly to the panel.

As can be seen, if a solid (such as a resin) or a liquid (such as glycerol) having a refractive index of 1.06 or more is put on the surface of the retroreflective layer 2, then the quantity of light that enters the retroreflective layer 2 from the twice reflected direction defined by the MCCA shape of the retroreflective layer 2 can be reduced. As a result, the dark-state leakage can be minimized when the viewer is facing the display panel squarely.

More specifically, if the gap between the retroreflective layer 2 and the rear substrate 12 is filled with a liquid or a solid having a refractive index of about 1.06, then the quantity of the twice reflected light leaving the display panel perpendicularly to the panel can be reduced by more than 33% compared to the conventional one. As a result, more significant effects are achieved than the situation where the retroreflective layer 2. is just arranged with the gap filled with the air. However, the light is always scattered by the display panel and the MCCA to some extent and the twice reflected light leaving the display panel perpendicularly cannot be totally eliminated. On the other hand, if the gap between the retroreflective layer 2 and the rear substrate 12 is filled with glycerol with a refractive index of 1.47, then no twice reflected light will be seen to leave the display panel perpendicularly. As a result, the viewer facing the display panel squarely can watch the screen without being irritated by the dark-state leakage caused by the twice reflected light.

Next, it will be described with reference to FIG. 16A how about a light ray 89 that has been incident onto the display panel perpendicularly. The light ray 89 also enters the retroreflective layer 2 perpendicularly and then is partially reflected in the twice reflected direction. However, this twice reflected light is not directed toward the viewer due to the difference in refractive index between the display panel 15 and the air and does not debase the display quality.

Next, a situation where the viewer is watching the display panel of the reflective display device obliquely will be described with reference to FIG. 16B. The azimuth angle α of the viewing angle direction is supposed to be equal to that of the twice reflected direction (i.e., α=30, 150 or 270 degrees).

If a light ray 91 that has been incident onto the display panel 15 from the same azimuthal direction as that of the viewing angle direction enters the retroreflective layer 2 at an angle $\theta_B$ that is smaller than the polar angle β of 71 degrees, for example, of the twice reflected direction (i.e., if $\theta_B$=71–d), then the twice reflected light thereof is reflected by the retroreflective layer 2 in the direction that defines a tilt angle d with respect to a normal to the retroreflective layer 2 and then leaves the display panel in the direction that defines a tilt angle d' (where d'>d) with respect to the normal to the display panel 15 as shown in FIG. 16B. Consequently, the twice reflected light will enter the eyes of a viewer if he or she is located in that direction that defines the tilt angle d' with respect to the normal to the display panel 15 in a particular azimuthal direction, thus causing the dark-state leakage and other deteriorations in display quality.

Suppose the solid or liquid 83 put on the surface of the retroreflective layer 2 and the inside of the display panel both have a refractive index of 1.5 and the MCCA of the retroreflective layer 2 has high shape accuracy, for example. In that case, no light will enter the display panel at an angle d that is less than 29.7 degrees. Accordingly, in that example, the angle d of the twice reflected light that could reach the viewer's eyes is 28.7 degrees or more and the angle d' thereof is 46 degrees or more. Thus, it can be seen that if the viewer were watching the display panel 15 from a direction that defines a tilt angle of 46 degrees or more with respect to the azimuthal direction of the twice reflected direction (i.e., if α=30, 150 or 270 degrees and β≧46), the dark-state leakage and other phenomena would happen.

In this preferred embodiment, the retroreflective layer 2 is arranged such that the azimuthal direction of one of the twice reflected directions substantially agrees with the on-screen downward direction. That is why if the viewer is watching the display panel 15 from a direction that defines a predetermined tilt angle (e.g., 46 degrees in the example described above) or more with respect to a normal to the display panel, the effect caused by the twice reflected light can be reduced to two-thirds. As a result, the dark-state leakage and other deteriorations in display quality can be minimized. The predetermined angle is changeable with the refractive indices of respective members of the reflective display device and the shape accuracy of the MCCA.

In the preferred embodiment described above, the gap between the retroreflective layer 2 and the rear substrate 12 is filled with the liquid or solid 83 having a refractive index of 1.06 or more. However, the present invention is in no way limited to this specific preferred embodiment. Alternatively, the surface of the MCCA may be in contact with any layer having a refractive index of 1.06 or more (i.e., a high refractive index layer). If that layer has a high refractive index, then the light entering the retroreflector will have a small angle of incidence. As a result, the retroreflectivity can be increased and a better black display is realized. The high refractive index layer may be made of an inorganic material (e.g., $TiO_2$ having a refractive index of 2.7), which generally has a higher refractive index than an organic material. However, an inorganic material having a higher refractive index than $TiO_2$ (e.g., $Sb_2S_3$ with a refractive index of 3.0) has low transparency in the visible radiation range. That is why if the high refractive index layer were made of such an inorganic material, then the display quality would decrease significantly. In view of this consideration, when made of an inorganic material, the high refractive index layer preferably has a refractive index of 2.7 or less.

Embodiment 3

Hereinafter, a display device according to a third preferred embodiment of the present invention will be described with reference to the accompanying drawings. The display device of this preferred embodiment is a reflective display device having an MCCA embedded structure.

Figure 17:
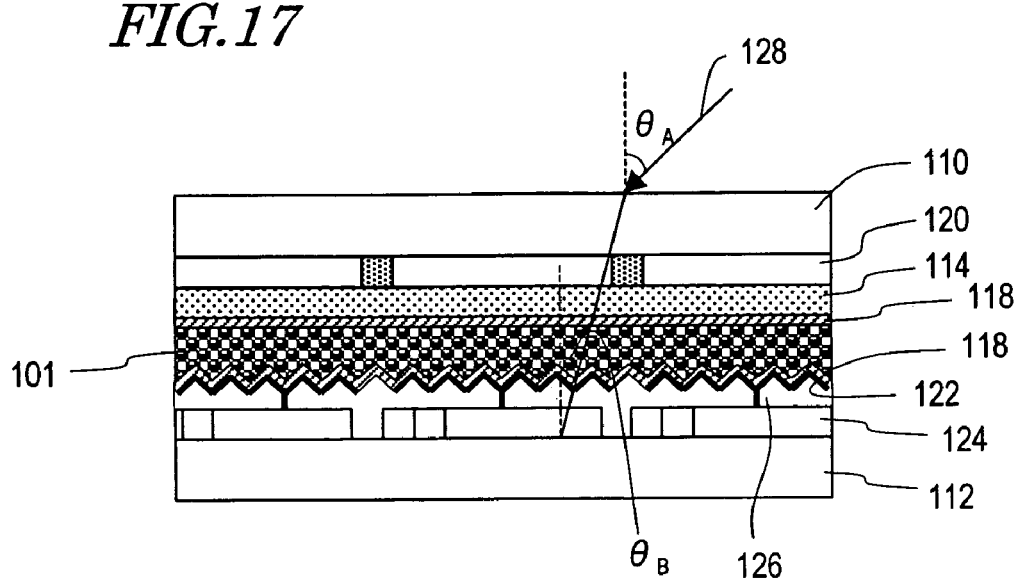
FIG. 17 is a schematic cross-sectional view illustrating a configuration for a reflective display device according to a third preferred embodiment of the present invention.

FIG. 17 is a schematic cross-sectional view illustrating a configuration for a reflective display device according to this preferred embodiment. The display device of this preferred embodiment includes a front substrate 110 with color filters 120, a transparent electrode 114 and an alignment film 118, a rear substrate 112, which is arranged so as to face the front substrate 110, and a liquid crystal layer 101 interposed between these substrates 110 and 112. The rear substrate 112 includes a plurality of TFTs 124 functioning as switching elements, an insulating layer 126 with an MCCA shape provided on the TFTs 124, a plurality of reflective electrodes 122 and an alignment layer 118. The reflective electrodes 122 have been formed on the insulating layer 126 and also have the same MCCA shape as the surface shape of the insulating layer 126. Also, the reflective electrodes 122 are spaced apart from each other and provided for respective pixels, i.e., units of the image to be presented, and connected to the respective drain electrodes of their associated TFTs 124 by way of contact holes that have been cut through the insulating layer 126. The alignment layer 118 has been deposited on the insulating layer 126 and reflective electrodes 122 and has unevenness representing the surface shape of the insulating layer 126. As in the preferred embodiments described above, the liquid crystal layer 101 is a scattering type that can switch between a light transmitting state and a light scattering state.

In this preferred embodiment, the reflective electrodes 122 function both as pixel electrodes and as a retroreflective layer. The MCCA shape of the reflective electrodes 122 is defined as already described with reference to FIG. 10B. That is to say, the reflective electrodes 122 are arranged such that the azimuthal direction defined by projecting a normal to one of the three planes of a corner cube onto a virtual plane and the azimuthal direction defined by projecting the on-screen upward direction onto the virtual plane form an angle γ of 30 degrees or less or that the azimuthal direction of the twice reflected direction defined by the MCCA shape and the on-screen downward direction form an angle ω of 30 degrees or less.

In this preferred embodiment, a light ray 128 that has entered the front substrate 110 is transmitted through the inside of the display panel having a substantially uniform refractive index (of 1.5, for example) and then incident on the reflective electrodes 122. In this case, the angle of incidence (or polar angle) $\theta_B$ of the light ray 128 on the reflective electrodes 122 is smaller than the angle of incidence (or polar angle) $\theta_A$ of the light ray 128 on the front substrate 110 (i.e., $\theta_B<\theta_A$) as in the second preferred embodiment described above.

In this preferred embodiment, the behavior of the light directed toward the front substrate 110 through the air (with a refractive index of 1.00) is the same as that of the light that has already been described for the second preferred embodiment with reference to FIGS. 16A and 16B. Accordingly, if the viewer is facing the display panel squarely, the angle of incidence $\theta_B$ of the light on the reflective electrodes 122 is limited due to the difference in refractive index between the inside of the display panel and the air. As a result, the display quality is hardly debased by the twice reflected light. On the other hand, if the viewer is watching the display panel from a direction that defines a predetermined tilt angle (of 46 degrees, for example) with respect to a normal to the display panel, the effect caused by the twice reflected light can be reduced to two-thirds of the conventional one by adjusting the arrangement of the MCCA shape of the reflective electrodes 122. Consequently, the dark-state leakage, grayscale inversion and other deteriorations can be minimized.

Figure 18:
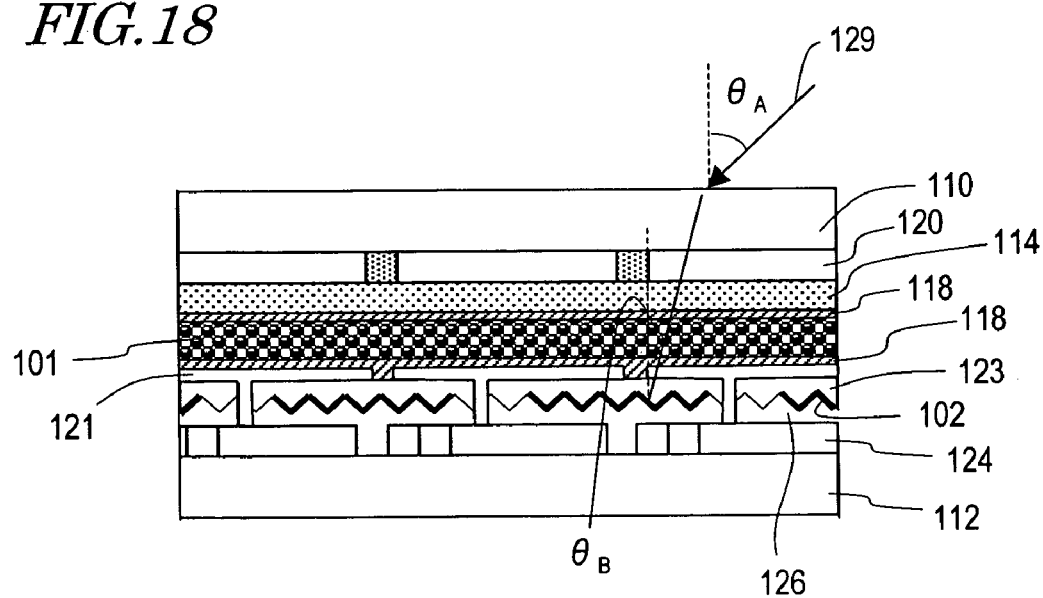
FIG. 18 is a schematic cross-sectional view illustrating a configuration for another reflective display device according to the third preferred embodiment of the present invention.

Another reflective display device according to this preferred embodiment may have the configuration shown in FIG. 18 instead of that illustrated in FIG. 17.

Unlike the configuration shown in FIG. 17, the reflective display device shown in FIG. 18 is designed such that the insulating layer 126 with the MCCA shape, a retroreflective layer 102, a flattening resin layer 123, a plurality of transparent pixel electrodes 121 and the alignment layer 118 are stacked in this order on the TFTs 124 on the rear substrate 112. The retroreflective layer 102 also has the MCCA shape corresponding to the surface shape of the insulating layer 126. The unevenness on the surface of the retroreflective layer 102 is smoothed out with the flattening resin layer 123. Thus, the pixel electrodes 121 and alignment layer 118 have substantially flat surfaces. The pixel electrodes 121 are connected to the respective drain electrodes of their associated TFTs 124 by way of contact holes that have been cut through the insulating layer 126 and flattening resin layer 123.

In this alternative configuration, a light ray 129 that has entered the front substrate 110 is transmitted through the inside of the display panel having a substantially uniform refractive index (of 1.5, for example) and then incident on the retroreflective layer 102. In this case, the angle of incidence (or polar angle) $\theta_B$ of the light ray 129 on the retroreflective layer 102 is smaller than the angle of incidence (or polar angle) $\theta_A$ of the light ray 129 on the front substrate 110 (i.e., $\theta_B < \theta_A$) as in the configuration shown in FIG. 17. Thus, the behavior of the light directed toward the front substrate 110 through the air (with a refractive index of 1.00) is the same as that of the light that has already been described for the second preferred embodiment with reference to FIGS. 16A and 16B. As a result, the same effects as those of the configuration shown in FIG. 17 are achieved by this configuration, too.

The reflective display device of this preferred embodiment does not have to have the configuration shown in FIG. 17 or 18 but only needs to include a layer having the MCCA shape and functioning as a retroreflective layer between the liquid crystal layer and rear substrate of a display panel. A layer that contacts with the surface of that layer functioning as a retroreflective layer (i.e., the alignment layer 118 in the configuration shown in FIG. 17 or the flattening resin layer 123 in the configuration shown in FIG. 18) has a refractive index of 1.06 to 2.7, which is typically almost as high as those of the other components (including the liquid crystal layer and substrates) of the display panel.

According to various preferred embodiments of the present invention described above, in a reflective display device including a retroreflective layer, the dark-state leakage, grayscale inversion and other deteriorations in display quality, which would be caused by light that enters the retroreflective layer from a particular direction, can be minimized and a high-contrast or highly visible display is realized. In addition, the display quality can always be improved irrespective of the MCCA shape accuracy of the retroreflective layer.

The present invention is effectively applicable for use in both a reflective display device including a retroreflective layer inside a display panel and a reflective display device in which the retroreflective layer is arranged behind the display panel.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This non-provisional application claims priority under 35 USC § 119(a) on Patent Application No. 2005-025453 filed in Japan on Feb. 1, 2005, the entire contents of which are hereby incorporated by reference.

What is claimed is:

1. A reflective display device comprising
   a retroreflective layer including a plurality of unit structures that are arranged two-dimensionally on a virtual plane, and
   a modulating layer, which is arranged closer to a viewer than the retroreflective layer is and which is switchable between a first state and a second state that have mutually different optical properties,
   the reflective display device conducting a display operation by using light that has been reflected back from the retroreflective layer,
   wherein each said unit structure of the retroreflective layer has a recess defined by three planes that are opposed substantially perpendicularly to each other, and
   wherein an azimuthal direction, which is defined by projecting a normal to one of the three planes onto the virtual plane, and another azimuthal direction, which is defined by projecting an on-screen upward direction onto the virtual plane, form an angle of at most 30 degrees.

2. A reflective display device comprising
   a retroreflective layer including a plurality of unit structures that are arranged two-dimensionally on a virtual plane, and
   a modulating layer, which is arranged closer to a viewer than the retroreflective layer is and which is switchable between a first state and a second state that have mutually different optical properties,
   the reflective display device conducting a display operation by using light that has been reflected back from the retroreflective layer,
   wherein each said unit structure of the retroreflective layer has a recess defined by three planes that are opposed substantially perpendicularly to each other, and
   wherein a light ray, which has been incident substantially perpendicularly to the virtual plane and then reflected by only two of the three planes of any of the unit structure, goes back in multiple particular directions that are defined by the shape of the unit structure, and
   wherein an azimuthal direction, which is defined by projecting any of those particular directions onto the virtual plane, and another azimuthal direction, which is defined by projecting an on-screen downward direction onto the virtual plane, form an angle of at most 30 degrees.

3. The reflective display device of claim 1, wherein the angle is 12 degrees or less.

4. The reflective display device of claim 2, wherein the angle is 12 degrees or less.

5. The reflective display device of claim 1, wherein the unit structures of the retroreflective layer are arranged so as to face substantially the same direction.

6. The reflective display device of claim 2, wherein the unit structures of the retroreflective layer are arranged so as to face substantially the same direction.

7. The reflective display device of claim 5, wherein the three planes of each said unit structure, which are opposed substantially perpendicularly to each other, are all square.

8. The reflective display device of claim 6, wherein the three planes of each said unit structure, which are opposed substantially perpendicularly to each other, are all square.

9. The reflective display device of claim 1, further comprising:
   a front substrate, which is arranged closer to the viewer than the modulating layer is;
   a rear substrate, which is arranged behind the modulating layer and which faces the front substrate; and
   means for applying a voltage to the modulating layer, the means being arranged between the front and rear substrates,
   wherein the retroreflective layer is arranged between the modulating layer and the rear substrate.

10. The reflective display device of claim 2, further comprising:
   a front substrate, which is arranged closer to the viewer than the modulating layer is;
   a rear substrate, which is arranged behind the modulating layer and which faces the front substrate; and
   means for applying a voltage to the modulating layer, the means being arranged between the front and rear substrates,
   wherein the retroreflective layer is arranged between the modulating layer and the rear substrate.

11. The reflective display device of claim 1, further comprising:
   a front substrate, which is arranged closer to the viewer than the modulating layer is;
   a rear substrate, which is arranged behind the modulating layer and which faces the front substrate; and
   means for applying a voltage to the modulating layer, the means being arranged between the front and rear substrates,
   wherein the retroreflective layer is arranged behind the rear substrate.

12. The reflective display device of claim 2, further comprising:
   a front substrate, which is arranged closer to the viewer than the modulating layer is;
   a rear substrate, which is arranged behind the modulating layer and which faces the front substrate; and
   means for applying a voltage to the modulating layer, the means being arranged between the front and rear substrates,
   wherein the retroreflective layer is arranged behind the rear substrate.

13. The reflective display device of claim 11, further comprising a high refractive index layer with a refractive index of 1.06 to 2.7 between the retroreflective layer and the rear substrate, the respective surfaces of the unit structures of the retroreflective layer being in contact with the high refractive index layer.

14. The reflective display device of claim 12, further comprising a high refractive index layer with a refractive index of 1.06 to 2.7 between the retroreflective layer and the rear substrate, the respective surfaces of the unit structures of the retroreflective layer being in contact with the high refractive index layer.

15. The reflective display device of claim 11, further comprising a low refractive index layer with a refractive index of 1.0 to less than 1.06 between the retroreflective layer and the rear substrate, the respective surfaces of the unit structures of the retroreflective layer being in contact with the low refractive index layer.

16. The reflective display device of claim 12, further comprising a low refractive index layer with a refractive index of 1.0 to less than 1.06 between the retroreflective layer and the rear substrate, the respective surfaces of the unit structures of the retroreflective layer being in contact with the low refractive index layer.

* * * * *